US012230056B2

(12) United States Patent
Rossa

(10) Patent No.: US 12,230,056 B2
(45) Date of Patent: Feb. 18, 2025

(54) SYSTEMS AND METHODS FOR ANALYZING COMPUTATIONAL ARCHITECTURES

(71) Applicant: F0cal, Inc., Cambridge, MA (US)

(72) Inventor: Brian F. Rossa, Cambridge, MA (US)

( * ) Notice: Subject to any disclaimer, the term of this patent is extended or adjusted under 35 U.S.C. 154(b) by 0 days.

(21) Appl. No.: 18/061,980

(22) Filed: Dec. 5, 2022

(65) Prior Publication Data

US 2023/0215215 A1 Jul. 6, 2023

Related U.S. Application Data

(63) Continuation of application No. 17/442,451, filed as application No. PCT/US2020/025159 on Mar. 27, 2020, now Pat. No. 11,537,394.

(60) Provisional application No. 62/851,017, filed on May 21, 2019, provisional application No. 62/824,975, filed on Mar. 27, 2019.

(51) Int. Cl.

| | |
|---|---|
| ***G06V 40/16*** | (2022.01) |
| ***G06F 8/77*** | (2018.01) |
| ***G06N 7/01*** | (2023.01) |
| ***G06V 10/25*** | (2022.01) |
| ***G06V 20/40*** | (2022.01) |
| ***G06V 20/52*** | (2022.01) |

(52) U.S. Cl.

CPC .............. *G06V 40/168* (2022.01); *G06F 8/77* (2013.01); *G06V 10/25* (2022.01); *G06V 20/46* (2022.01); *G06V 20/52* (2022.01); *G06N 7/01* (2023.01)

(58) Field of Classification Search

None

See application file for complete search history.

(56) References Cited

U.S. PATENT DOCUMENTS 7,007,270 B2 * 2/2006 Martin ................ G06F 11/3447 714/E11.197
7,293,260 B1 * 11/2007 Dmitriev ............ G06F 11/3644 717/130
7,870,610 B1 * 1/2011 Mitchell ................ G06F 21/53 726/25
8,176,560 B2 5/2012 Jin et al.
9,152,530 B2 * 10/2015 Gross .................. G06F 11/3058
9,753,745 B1 * 9/2017 Guo ........................ G06F 9/451
(Continued)

OTHER PUBLICATIONS

U. Neumann, "Communication costs for parallel volume-rendering algorithms," in IEEE Computer Graphics and Applications, vol. 14, No. 4, pp. 49-58, Jul. 1994, doi: 10.1109/38.291531. (Year: 1994).*
(Continued)

*Primary Examiner* — Andrew M. Lyons

(57) ABSTRACT

Systems and methods for estimating a random distribution for an overall metric for a composite node, the composite node comprising a plurality of nodes. For each data atom of a plurality of data atoms being input to the composite node, and for each node of the plurality of nodes, at least one value may be generated for a per-node metric with respect to the data atom. A value for the overall metric with respect to the data atom may be generated based on the per-node metric values of the plurality of nodes. At least one parameter of the random distribution for the overall metric for the composite node may be estimated based on the overall metric values with respect to the plurality of data atoms.

16 Claims, 12 Drawing Sheets

(56) References Cited

U.S. PATENT DOCUMENTS

| | | | | |
|---|---|---|---|---|
| 11,537,394 | B2 | 12/2022 | Rossa | |
| 2003/0055607 | A1* | 3/2003 | Wegerich | G06F 11/3447 714/E11.197 |
| 2004/0111708 | A1* | 6/2004 | Calder | G06F 11/3447 717/135 |
| 2008/0244533 | A1 | 10/2008 | Berg et al. | |
| 2011/0154295 | A1* | 6/2011 | Aharoni | G06F 8/74 717/125 |
| 2012/0066172 | A1 | 3/2012 | Jebara | |
| 2012/0304288 | A1* | 11/2012 | Wright | H04L 63/1425 726/22 |
| 2016/0062878 | A1* | 3/2016 | Westrelin | G06F 9/4552 717/130 |
| 2017/0103550 | A1 | 4/2017 | Cherubini et al. | |
| 2017/0109841 | A1 | 4/2017 | Sadikovic | |
| 2017/0359181 | A1 | 12/2017 | Chari et al. | |
| 2018/0082172 | A1 | 3/2018 | Patel et al. | |
| 2019/0005407 | A1 | 1/2019 | Harris et al. | |
| 2019/0303263 | A1 | 10/2019 | Fleming, Jr. et al. | |
| 2020/0004601 | A1* | 1/2020 | Ahmad | G06F 11/3003 |
| 2020/0226496 | A1 | 7/2020 | Basu et al. | |

OTHER PUBLICATIONS

U. Neumann, “Parallel volume-rendering algorithm performance on mesh-connected multicomputers,” Proceedings of 1993 IEEE Parallel Rendering Symposium, San Jose, CA, USA, 1993, pp. 97-104, doi: 10.1109/PRS.1993.586093. (Year: 1993).*

K. M. Nichols and J. T. Edmark, “Modeling multicomputer systems with PARET,” in Computer, vol. 21, No. 5, pp. 39-48, May 1988, doi: 10.1109/2.57. (Year: 1988).*

International Search Report and Written Opinion dated Jul. 30, 2020 for International Patent Application No. PCT/US2020/025159; 22 Pages.

Biswas et al.; “Community detection in networks using atom stabilization algorithm”; 2017 IEEE 4th International Conference on Soft Computing & Machine Intelligence (ISCMI); Nov. 2017; 5 Pages.

* cited by examiner

- Updating Node 105 from Idle to Ready

- Updating Node 105 from Ready to Blocked
- Updating Port "nextFrame" from Vacant to Occupied
- Updating Edge 105-110 from Idle to Ready

- Updating Edge 105-110 from Ready to Done
- Updating Port "nextFrame" from Occupied to Vacant
- Updating Node 105 from Blocked to Ready
- Updating Port "frame" from Vacant to Occupied
- Updating Node 110 from Idle to Ready

- Updating Node 110 from Ready to Working

- Updating Port "detectedRegions" from Vacant to Occupied
- Updating Node 110 from Working to Blocked
- Updating Edge 110-115 from Idle to Ready

- Updating Edge 110-115 from Ready to Done
- Updating Port "detectedRegions" from Occupied to Vacant
- Updating Node 110 from Blocked to Working
- Updating Port "faceCandidates" from Vacant to Occupied
- Updating Node 115 from Idle to Ready

- Updating Node 115 from Ready to Working

- Updating Node 115 from Working to Done

- Updating Node 115 from Done to Idle
- Updating Port "faceCandidates" from Occupied to Vacant
- Updating Edge 110-115 from Done to Idle

- Updating Node 110 from Working to Done
- Updating Port "detectedRegions" from Vacant to Occupied
- Updating Edge 105-110 from Idle to Ready

- Updating Edge 110-115 from Ready to Done
- Updating Port "detectedRegions" from Occupied to Vacant
- Updating Port "faceCandidates" from Vacant to Occupied
- Updating Node 115 from Idle to Ready

- Updating Node 110 from Done to Idle
- Updating Port "frame" from Occupied to Vacant
- Updating Edge 105-110 from Done to Idle

SYSTEMS AND METHODS FOR ANALYZING COMPUTATIONAL ARCHITECTURES

CROSS REFERENCE TO RELATED APPLICATIONS

This application is a continuation of U.S. application Ser. No. 17/442,451 filed on Sep. 23, 2021, which is a U.S. National Stage Application of PCT Application PCT/US2020/025159 filed in the English language on Mar. 27, 2020, which claims the benefit of U.S. Provisional Application 62/824,975 filed on Mar. 27, 2019 and U.S. Provisional Application 62/851,017 filed on May 21, 2019. The entire contents of these applications are incorporated by reference herein.

BACKGROUND

Modern computing applications, such as artificial intelligence (AI) applications, are complex artifacts of human ingenuity. These applications may combine various hardware and/or software components in various ways to perform computational tasks. An engineer responsible for building a computing application may select a suitable combination of hardware and/or software components, and may arrange the selected hardware and/or software components in a suitable manner, so that a resulting system may satisfy one or more application requirements.

SUMMARY

In accordance with some embodiments, a computer-implemented method is provided for estimating a random distribution for an overall metric for a composite node, the composite node comprising a plurality of nodes, the method comprising acts of: for each data atom of a plurality of data atoms being input to the composite node: for each node of the plurality of nodes, generating at least one value for a per-node metric with respect to the data atom; and generating, based on the per-node metric values of the plurality of nodes, a value for the overall metric with respect to the data atom; and estimating, based on the overall metric values with respect to the plurality of data atoms, at least one parameter of the random distribution for the overall metric for the composite node.

In accordance with some embodiments, a computer-implemented method is provided for simulating an overall random behavior of a computational architecture, the method comprising acts of: generating a first outcome according to a first random distribution associated with a first software component of the computational architecture; and generating a second outcome according to a second random distribution associated with a second software component of the computational architecture, wherein: the second software component receives at least one input that is dependent on an output of the first software component; and the second random distribution is determined based on the first outcome generated according to the first random distribution.

In accordance with some embodiments, a computer-implemented method is provided for analyzing a random behavior of a computational architecture, comprising acts of: analyzing source code of the computational architecture to identify at least one callable object that is likely to impact a selected metric of the computational architecture; analyzing binary code of the computational architecture to determine whether the at least one callable object is reachable during execution of the binary code; and generating a tracepoint to be inserted into the binary code, wherein: the tracepoint, when executed by a processor, causes the processor to collect a selected type of information during execution of the binary code.

In accordance with some embodiments, a computer-implemented method is provided for simulating an overall random behavior of a computational architecture, the computation architecture comprising a first node and a second node, comprising acts of: labeling the first node with a first color indicative of a first hardware component; simulating, based on a state of the first hardware component, a random behavior of the first node; labeling the second node with a second color indicative of a second hardware component; simulating, based on a state of the second hardware component, a random behavior of the second node; and simulating, based on the random behavior of the first node and the random behavior of the second node, the overall random behavior of the computational architecture.

In accordance with some embodiments, a system is provided, comprising at least one computer processor and at least one computer-readable storage medium having stored thereon instructions which, when executed, program the at least one computer processor to perform any of the methods described herein.

In accordance with some embodiments, at least one computer-readable storage medium is provided, having stored thereon instructions which, when executed, program at least one processor to perform any of the methods described herein.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

Figure 1:
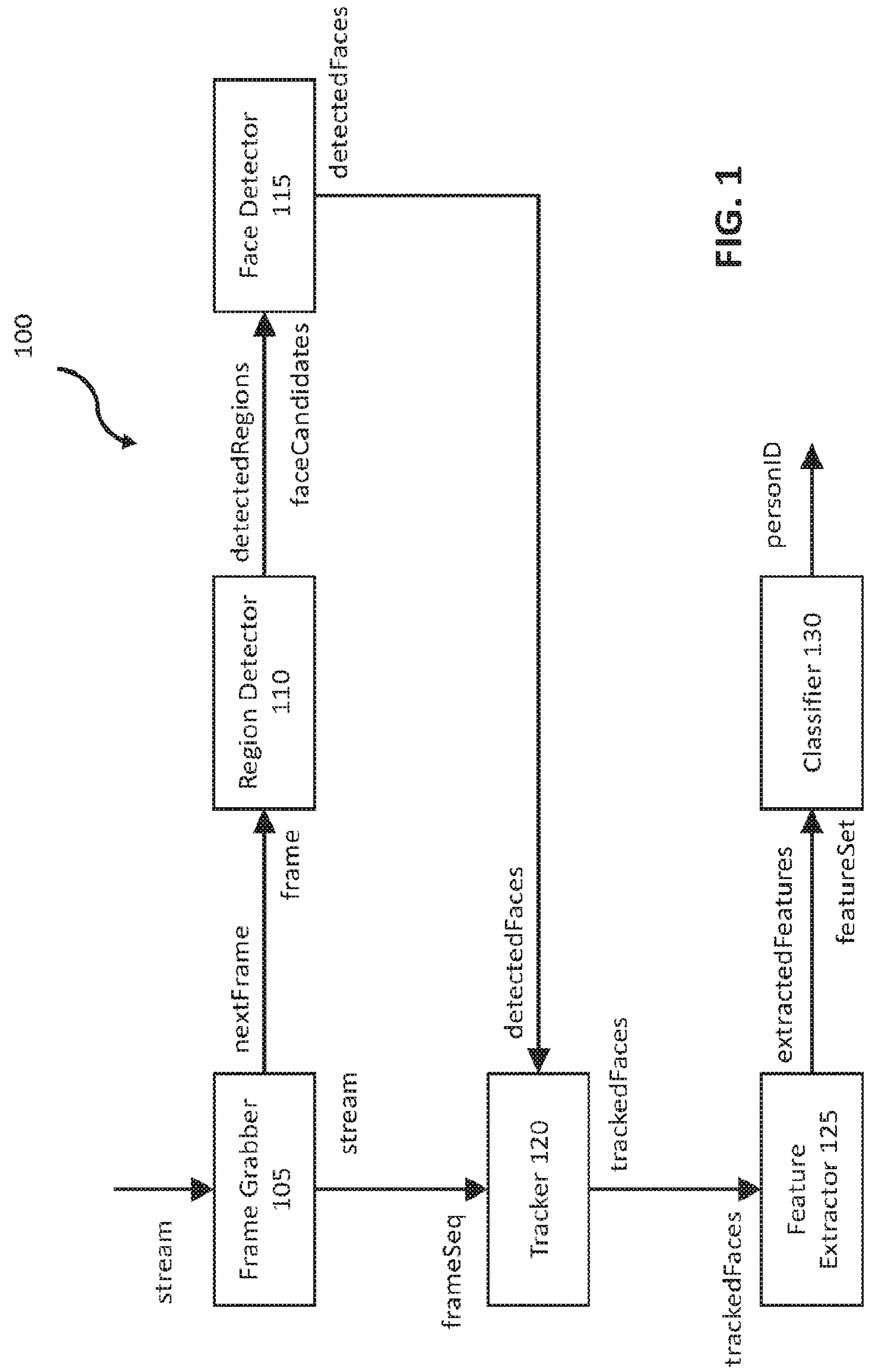
FIG. 1 shows an illustrative graph model 100, in accordance with some embodiments.

Referring now to FIG. 1

Although reference is made herein to particular materials, it is appreciated that other materials having similar functional and/or structural properties may be substituted where appropriate, and that a person having ordinary skill in the art would understand how to select such materials and incorporate them into embodiments of the concepts, techniques, and structures set forth herein without deviating from the scope of those teachings.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer “A” over layer “B” include situations in which one or more intermediate layers (e.g., layer “C”) is between layer “A” and layer “B” as long as the relevant characteristics and functionalities of layer “A” and layer “B” are not substantially changed by the intermediate layer(s). The following definitions and abbreviations are to be used for the interpretation of the claims and the specification. As used herein, the terms “comprises,” “comprising, “includes,” “including,” “has,” “having,” “contains” or “containing,” or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term “exemplary” is used herein to mean “serving as an example, instance, or illustration. Any embodiment or design described herein as “exemplary” is not necessarily to be construed as preferred or advantageous over other embodiments or designs. The terms “one or more” and “one or more” are understood to include any integer number greater than or equal to one, i.e. one, two, three, four, etc. The terms “a plurality” are understood to include any integer number greater than or equal to two, i.e. two, three, four, five, etc. The term “connection” can include an indirect “connection” and a direct “connection.”

References in the specification to “one embodiment, “an embodiment,” “an example embodiment,” etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms “upper,” “lower,” “right,” “left,” “vertical,” “horizontal, “top,” “bottom,” and derivatives thereof shall relate to the described structures and methods, as oriented in the drawing figures. The terms “overlying,” “atop,” “on top, “positioned on” or “positioned atop” mean that a first element, such as a first structure, is present on a second element, such as a second structure, where intervening elements such as an interface structure can be present between the first element and the second element. The term “direct contact” means that a first element, such as a first structure, and a second element, such as a second structure, are connected without any intermediary elements.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms “approximately” and “about” may be used to mean within ±20% of a target value in some embodiments, within ±10% of a target value in some embodiments, within ±5% of a target value in some embodiments, and yet within ±2% of a target value in some embodiments. The terms “approximately” and “about” may include the target value. The term “substantially equal” may be used to refer to values that are within ±20% of one another in some embodiments, within ±10% of one another in some embodiments, within ±5% of one another in some embodiments, and yet within ±2% of one another in some embodiments.

The term “substantially” may be used to refer to values that are within ±20% of a comparative measure in some embodiments, within ±10% in some embodiments, within ±5% in some embodiments, and yet within ±2% in some embodiments. For example, a first direction that is “substantially” perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

In some embodiments, an engineer responsible for building a computing application may, before expending resources to implement a proposed design, analyze the design to predict whether the design is likely to satisfy one or more application requirements. Such requirements may be given in terms of metrics that vary from one type of computing application to another. For instance, relevant metrics for AI applications may include one or more of the following.

| | |
|---|---|
| Accuracy | Metrics having to do with correctness of a system's response, such as precision, recall, type I error rate, type II error rate, ect. |
| Quality of service (QoS) | Metrics having to do with reliability of a system's response, such as throughput, latency, data loss rate, jitter, etc. |
| Physical characteristics | Metrics such as size, weight, etc. of a system. |
| Resource consumption | Metrics such as power, memory, bandwidth, etc. of a system. |
| Cost | Metrics having to do with money, time, and/or effort expended on a system, such as acquisition cost, operat- ing cost, ect. |

In many engineering disciplines (e.g., mechanical engineering, civil engineering, etc.), computer-aided design (CAD) tools are available to help engineers analyze proposed designs before moving on to implementation. For instance, a CAD tool may provide one or both of the following workflows.

| | |
|---|---|
| Design workflow | The CAD tool may allow an engineer to build a model of a proposed design without building a full-fledged system. |
| De-risk workflow | The CAD tool may use the model of the proposed design to make predictions for metrics of interest. |

The inventor has recognized and appreciated that it may be desirable to provide CAD tools to engineers who are building computing applications. Examples of computing applications include, but are not limited to, AI applications (e.g., computer vision, natural language processing, etc.), simulation applications (e.g., structural analysis, fluid dynamics, etc.), etc. For instance, it may be desirable to provide tools for modeling hardware and/or software components of computational architectures, and/or for predicting relevant metrics of such computational architectures.

Accordingly, in some embodiments, techniques are provided for instrumenting software code to collect run time data, and using the collected data to construct a model of the software code. Additionally, or alternatively, techniques are provided for using a model of software code to predict relevant metrics of the software code when run on different platforms (e.g., different operating systems and/or different hardware).

It should be appreciated that the techniques introduced above and/or discussed in detail below may be implemented in any of numerous ways, as these techniques are not limited to any particular manner of implementation. Examples of implementation details are provided herein solely for purposes of illustration. Furthermore, the techniques disclosed herein may be used individually or in any suitable combination, as aspects of the present disclosure are not limited to any particular technique or combination of techniques.

In some embodiments, a computational architecture may include a selected combination of hardware and/or software components arranged in a selected manner. For example, a computational architecture may include a set H of hardware components and/or a set S of software components. The set S may, sometimes, include multiple instances of a same piece of software (e.g., multiple calls to a same function).

In some embodiments, each software component s in S may be mapped to some hardware component h in H, indicating that the software component s is being run on the hardware component h. Thus, the set S of software components may be partitioned into {$S_h$ I h E 11}, where Sh includes one or more software components running on the hardware component h.

In some embodiments, each hardware component h in a computational architecture may be assigned a respective color, and a software component in the computational architecture running on the hardware component h may be visualized using the color assigned to the hardware component h. In this manner, an engineer viewing a visual representation of the computational architecture via a user interface may readily discern which software components are running on the same hardware component, and which software components are running on different hardware components.

It should be appreciated that aspects of the present disclosure are not limited to using different colors to provide visual differentiation. Additionally, or alternatively, different shapes, different textures, etc. may be used.

It also should be appreciated that aspects of the present disclosure are not limited to running each software component on a single hardware component. In some embodiments, a software component may be parallelized to run on multiple hardware components. Additionally, or alternatively, multiple software components that are instances of a same piece of software (e.g., multiple calls to a same function) may run on respective hardware components.

Any suitable combination of one or more hardware components and/or one or more software components may be included in a computational architecture. Examples of hardware components include, but are not limited to, general-purpose processors such as central processing units (CPUs), specialized processors such as graphical processing units (GPUs) and digital signal processors (DSPs), bus interfaces such as Peripheral Component Interconnect (PCI) buses, network interfaces such as network interface controllers (NICs), etc. Such a hardware component may be configured to process and/or transfer data.

In some embodiments, a hardware component may be described recursively. For instance, a microprocessor may include an arithmetic logic unit (ALU), a floating point unit (FPU), a memory management unit (MMU), etc. Additionally, or alternatively, a software component may be described recursively. For instance, a software module may include one or more submodules, and a submodule may in turn include one or more further submodules.

The inventor has recognized and appreciated that it may be desirable to describe software at a high level of granularity. Accordingly, in some embodiments, software component descriptions may be provided based on one or more namespaces used by a compiler to organize executable code generated from source code. For example, a software component description may correspond to a namespace-qualified logical block of code. In this manner, a hierarchy of software components may be provided that corresponds to a namespace. However, it should be appreciated that aspects of the present disclosure are not limited to associating software component descriptions with namespace-qualified identifiers.

The inventor has further recognized and appreciated that, to make useful predictions about computational architectures, it may be desirable to explicitly model data flow among various software components. For instance, a description of a first software component may indicate one or more arguments accepted by the first software component when the first software component is called by a second software component, one or more returns to be provided by the first software component to the second software component, one or more arguments to be passed to a third software component when the first software component calls the third software component, and/or one or more returns expected from the third software component.

Data flow among software components may be modeled in any suitable manner. In some embodiments, a graph model may be used, where software components in a computational architecture are represented by nodes in a graph. An edge between a pair of nodes in the graph may indicate data flow between the software components represented by the nodes. The edge may be directional, for example, from a first node to a second node, indicating that data is flowing from a first software component represented by the first node to a second software component represented by the second node.

FIG. 1 shows an illustrative graph model 100, in accordance with some embodiments. For instance, nodes in the graph model 100 may represent software components in a computational architecture for a facial recognition application.

In the example of FIG. 1, each node may have one or more incoming ports (also referred to as ingress ports) and/or one or more outgoing ports (also referred to as egress ports). Such a node may represent a software component, whereas an incoming port may represent an argument accepted by the software component, and an outgoing port may represent an argument passed to another software component when the software component calls the other software component.

For instance, a node 105 may represent a frame grabber module, which may receive, as input, a stream of image frames captured by a video camera (e.g., a visible light camera, an infrared camera, etc.). In some embodiments, the frame grabber 105 may forward the stream to a tracker module, which may be represented by a node 120. Additionally, or alternatively, the frame grabber may call a region detector module, which may be represented by a node 110, with an incoming frame from the stream.

In some embodiments, a port may have an associated name. For instance, the region detector 110 may have an incoming port named "frame" and an outgoing port named "detectedRegions." This may indicate that an input value received from a caller (e.g., the frame grabber 105) is stored in a variable named "frame," while a value stored in a variable named "detectedRegions" may be passed as an input to a callee (e.g., a face detector module, which may be represented by a node 115). For example, the value received from the caller (e.g., the frame grabber 105) may include a pointer to an image frame, while the value passed to the callee (e.g., the face detector 115) may include a pointer to a data structure storing information indicative of one or more regions detected from the image frame.

Although not shown in FIG. 1, a port may have an associated type. For instance, the "frame" port of the region detector 110 may have a type BMP, indicating that the region detector 110 may accept an image frame in a bitmap format. This may correspond to type information associated with the "frame" variable of the region detector.

In some embodiments, the face detector 115 may be configured to determine whether a detected region received from the region detector 110 is likely to represent a face. The face detector 115 may store one or more likely faces in a variable named "detectedFaces." The tracker 120 may receive the stream of image frames forwarded by the frame grabber 105, as well as the likely faces detected by the face detector 115, and may pass one or more tracked faces to a feature extractor module, which may be represented by a node 125. The feature extractor 125 may be configured to perform feature extraction on a tracked face, and may pass a set of features extracted from the tracked face to a classifier module, which may be represented by a node 130. The classifier 130 may be configured to match the extracted feature set against stored feature information for a plurality of individuals. If a match is found, the classifier 130 may output an identifier of the matching individual.

In some embodiments, a port of a node may have one or more attributes associated therewith. For instance, a port may have an attribute indicating whether the port is occupied or vacant, and/or an attribute indicating whether the port is a principal port or an auxiliary port. Such an attribute may be used to determine a behavioral semantics for the port.

In some embodiments, an attribute may take on one of a plurality of values, and each value may be assigned a respective shape, color, texture, etc. A port may be visualized using the shape, color, texture, etc. assigned to an attribute value of the port. For instance, occupied ports may be shown in red, while vacant ports may be shown in green. In this manner, an engineer viewing a visual representation of the graph model 100 via a user interface may readily differentiate between ports having different attribute values.

In some embodiments, a node in a graph may have one or more parameters associated therewith. A parameter may be set to a selected value, and that value may be used to analyze a computational session of a software component represented by the node (e.g., processing of one or more image frames by the software component). Like a port, a parameter may have associated therewith a name and/or a type.

In some embodiments, a port may be used to model input data to be processed (e.g., incoming image frames, speech frames, etc.), whereas a parameter may be used to model an input that is data independent (e.g., a threshold for identifying a matching pattern, a stopping criterion such as a number of iterations, etc.). However, it should be appreciated that aspects of the present disclosure are not limited to using parameters to model data-independent inputs, or to modeling such inputs at all.

Although facial recognition is discussed throughout the present disclosure, it should be appreciated that the techniques described herein may also be used to analyze other types of computational architectures, including, but not limited to, those designed to solve other pattern recognition problems.

In some embodiments, a node in the illustrative graph model 100 may be mapped to one or more hardware components running a software component represented by the node. If the software component is parallelized to run on multiple hardware components, a relevant portion of the graph model 100 may be replicated, where each replica may be mapped to a respective hardware component (or a respective set of hardware components). In some embodiments, such replication may be repeated one or more times.

Figure 2:
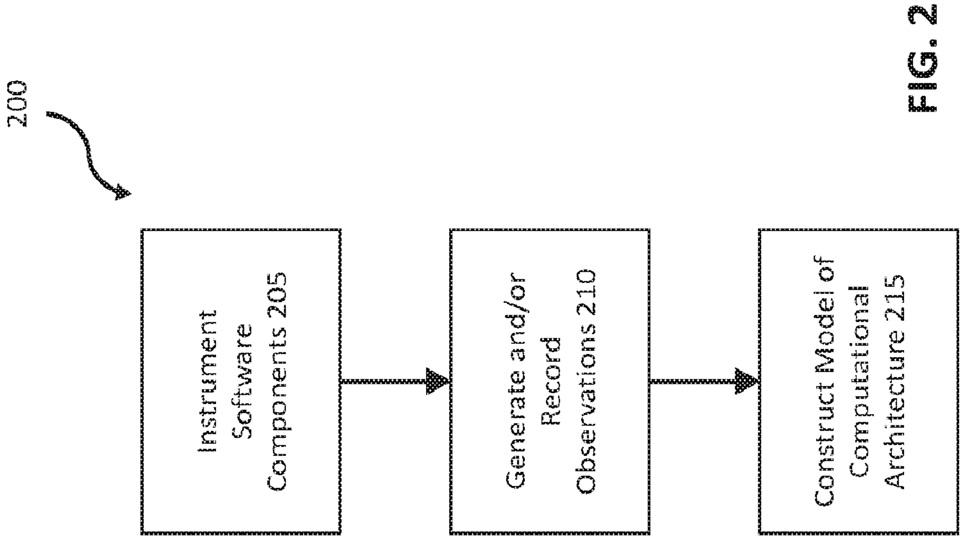
FIG. 2 shows an illustrative process 200 for constructing a model of a computational architecture, in accordance with some embodiments.

FIG. 2 shows an illustrative process 200 for constructing a model of a computational architecture, in accordance with some embodiments. For instance, the process 200 may be performed on a prototype of a computing application to construct the illustrative graph model 100 shown in FIG. 1.

The graph model 100 may in turn be used to determine whether to proceed with implementation of a full-fledged system.

At act 205, one or more software components of the prototype of the computing application may be instrumented. In some embodiments, source code analysis may be performed. For example, at compile time, an abstract syntax tree (AST) produced by a compiler may be used to identify one or more entities in the source code, such as one or more callable objects that are exported to final binary shared objects. Examples of callable objects include, but are not limited to, functions, constructors, methods on classes, etc.

In some embodiments, source code analysis may be performed to identify callable objects that may have a likely impact on a metric of interest (e.g., latency). For instance, source code analysis may be performed to identify callable objects involving a nested loop (e.g., a nested while loop), which may lead to heavy computation. Additionally, or alternatively, source code analysis may be performed to identify callable objects involving an outer join operation, which may lead to heavy memory usage.

In some embodiments, binary code analysis may be performed. For instance, binary code may be analyzed to determine whether a selected callable object is reachable during execution of the binary code. The selected callable object may be a callable object that has been determined (e.g., based on source code analysis) to have a likely impact on a metric of interest (e.g., latency).

In some embodiments, binary code analysis may be performed at load time. For instance, a system loader may be programmed to identify symbols to be loaded, and to search binary code (e.g., one or more dynamic link libraries) for such symbols. The inventor has recognized and appreciated that the symbols identified by the system loader may be used to determine whether a selected callable object is reachable during execution of the binary code.

In some embodiments, one or more tracepoints may be inserted into binary code (e.g., by a system loader), so that observations may be made about how the binary code is executed. A tracepoint may include a snippet of binary code that, when executed by a processor, causes the processor to dynamically collect a selected type of information.

In some embodiments, a tracepoint may be generated based on static analysis (e.g., source code analysis and/or binary code analysis). For instance, an AST produced by a compiler may provide information regarding one or more arguments accepted by a callable object. The inventor has recognized and appreciated that such information may be used to determine whether an argument is relevant for the model to be constructed. Accordingly, in some embodiments, one or more criteria may be provided for selecting one or more arguments on which information is to be collected at run time. For example, a criterion may indicate that, if an argument is an image of a selected type, then a tracepoint is to be inserted to capture information regarding the image.

Any suitable information may be captured regarding an argument, as aspects of the present disclosure are not so limited. In some embodiments, a memory location of an argument at call time may be captured. Additionally, or alternatively, a complete data structure stored at that memory location may be captured. The inventor has recognized and appreciated that capturing a complete data structure may be computationally intensive. Accordingly, in some embodiments, one or more selected characteristics may be captured, such as one or more characteristics that are likely to impact a metric of interest (e.g., latency). For instance, for a computer vision application, an image's width, height, entropy, etc. may be captured instead of, or in addition to, the image itself.

It should be appreciated that aspects of the present disclosure are not limited to using tracepoints in any particular manner, or at all. In some embodiments, a tracepoint may be inserted to cause an identifier of a callable object to be recorded upon entry of the callable object. This information may be used to determine if the callable object is actually called at run time. Additionally, or alternatively, first and second tracepoints may be inserted to request an operating system to poll a selected hardware counter, so that a change in the hardware counter between the first and second tracepoints may be recorded. For instance, a number of paging operations between the first and second tracepoints may be recorded, which may be used to detect cache thrashing.

At act 210, one or more instrumented software components may be run on one or more hardware components. An inserted tracepoint may, when executed, cause one or more observations to be collected (e.g., generated and/or recorded) dynamically. As an example, with reference to FIG. 1, a tracepoint may be inserted at an entry point of the illustrative region detector 110. This tracepoint may generate and/or record metadata regarding an image frame and/or other input passed into the region detector 110 by the illustrative frame grabber 105. Examples of such metadata include, but are not limited to, image size (e.g., width, height, etc.), chrominance channels (e.g., RGB, YUV, etc.), data types (e.g., float, unit8, etc.), pointer addresses, etc.

In some embodiments, an inserted tracepoint may emit an event when an observation is being collected. In response, information relating to execution context of the event may be accessed from an operating system and recorded in association with the event. For instance, in some embodiments, the operating system may support multi-threading. When a tracepoint inserted inside a callable object emits an event, a thread in which the callable object is executing may be identified and recorded. Additionally, or alternatively, a process in which the callable object is executing may be identified and recorded. Additionally, or alternatively, the callable object may be executing on a multi-core processor, and a core on which the callable object is executing may be identified and recorded. Additionally, or alternatively, a number of processor cycles consumed by the callable object may be identified and recorded.

The inventor has recognized and appreciated that certain information (e.g., timing information) may be obtained by polling hardware counters, but userspace code may not have ready access to hardware counters. Accordingly, in some embodiments, a userspace daemon may be used to collect observations. Such a daemon may be given sufficient privilege to request an operating system to poll one or more hardware counters, and to report polling results back to the daemon.

It should be appreciated that aspects of the present disclosure are not limited to collecting any particular type of context information, or any context information at all. Moreover, aspects of the present disclosure are not limited to collecting context information in response to events emitted by tracepoints. Additionally, or alternatively, context information may be collected in response to events emitted by an operating system.

The inventor has recognized and appreciated that, to make useful predictions about computational architectures, it may be desirable to generate and/or record observations about basic units of data on which common operations are performed. Such units of data are sometimes referred to herein as data atoms. For instance, common operations in computer vision, such as region detection, may be performed on image frames. Therefore, image frames may be treated as data atoms in a computer vision context. Similarly, common operations in speech recognition, such as phoneme classification, may be performed on short segments (e.g., 10 milliseconds) of a speech signal. Therefore, such speech segments may be treated as data atoms in a speech recognition context. However, it should be appreciated that aspects of the present disclosure are not limited to treating any particular type of data units as data atoms, or to any particular manner of generating and/or recording observations.

In some embodiments, data atoms may have regular structures. For instance, a data atom (e.g., an image frame) may include a data table comprising a plurality of columns (e.g., R, G, and B channels), where each column may be associated with a lower-level data type (e.g., unit 8). However, it should be appreciated that aspects of the present disclosure are not limited to any particular data structure.

Referring again to FIG. 2, a model of the computational architecture may be constructed at act 215. For instance, a graph model comprising one or more nodes and/or one or more edges may be constructed. However, it should be appreciated that aspects of the present disclosure are not limited to any particular modeling formalism.

In some embodiments, information generated and/or recorded by one or more tracepoints may indicate one or more calls to callable objects (e.g., functions, constructors, methods on classes, etc.). For each such call, a caller object and a callee object may be represented by respective nodes in the graph model. An argument passed from the caller object to the callee object may be represented by an edge from the caller node to the callee node. Likewise, a return from the callee object to the caller object may be represented by an edge from the callee node to the caller node.

Additionally, or alternatively, data flow may be inferred between two callable objects at a same level of a call stack. For instance, data flow may be inferred from a first object to a second object if a return of the first object is passed as input to the second object.

Additionally, or alternatively, data flow may be inferred from call stack information collected at run time. For instance, if a first callable object at a first level in a call stack and a second callable object at a second level in the call stack each store a pointer to a same location in a heap memory, data flow between the first callable object and the second callable object may be inferred. A direction of the data flow may be determined based on timing (e.g., timestamps recorded by respective tracepoints). For instance, if a pointer is recorded in a stack frame of a first object, and the same pointer is later recorded in a stack frame of a second object, then a data flow from the first object to the second object may be inferred.

In some embodiments, information generated and/or recorded by one or more tracepoints may map a callable object to one or more hardware components (e.g., chip, processor, core, etc.) on which the callable object is executing. For instance, if a callable object is parallelized to run on multiple cores, a node representing the callable object may be replicated, and each replica may be mapped to a respective core.

Figure 3:
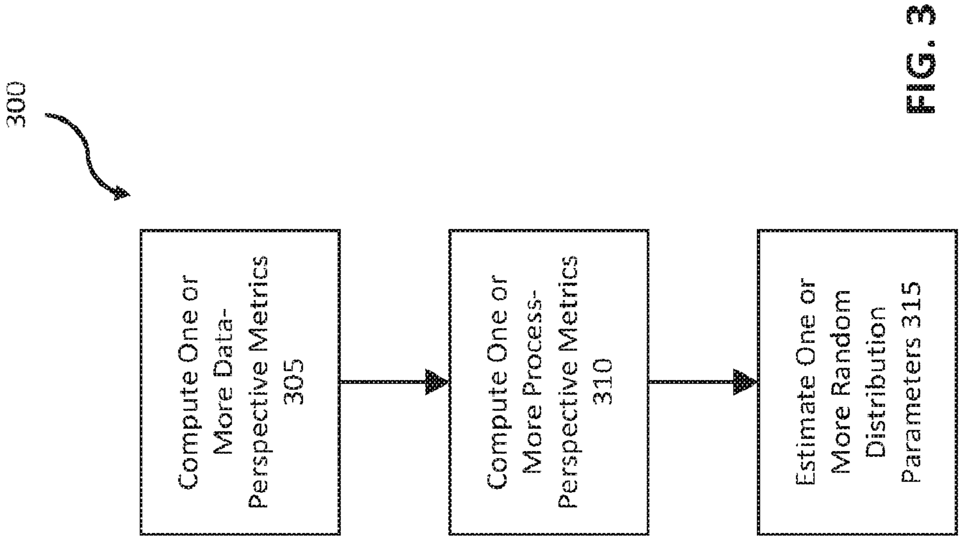
FIG. 3 shows an illustrative process 300 for computing one or more metrics, in accordance with some embodiments.

In some embodiments, the model constructed at act 215 in the illustrative process 200 of FIG. 2 may include one or more metrics about the computational architecture. FIG. 3 shows an illustrative process 300 for computing one or more metrics, in accordance with some embodiments. Such metrics may be computed based on observations collected from running a selected software component on a selected platform (e.g., a selected hardware component and/or a selected operating system).

At act 305, one or more data-perspective metrics may be computed. In some embodiments, the one or more data-perspective metrics may include a per-atom metric. For instance, a first tracepoint may be inserted at an entry point of the software component, and a second tracepoint may be inserted at an exit point of the software component. Given a data atom (e.g., an image or speech frame) processed by the software component, a processing delay (also referred to as latency) may be computed based on a first time stamp recorded by the first tracepoint and a second time stamp recorded by the first tracepoint.

It should be appreciated that any suitable per-atom metric may be computed in addition to, or instead of, latency.

In some embodiments, the one or more data-perspective metrics may include an aggregate metric. For instance, minimum latency, maximum latency, mean latency, medium latency, mode latency, etc. may be determined based on per-atom latency values for a plurality of data atoms.

In some embodiments, before an aggregate metric is computed, per-atom metric values may be segmented according to one or more suitable criteria. For example, for computer vision, per-frame latency values may be segmented based on image size (e.g., small, medium, and large). An aggregate metric (e.g., minimum latency, maximum latency, mean latency, medium latency, etc.) may be determined for each segment.

It should be appreciated that the terms "small," "medium," and "large" are used herein as relative labels. For instance, image frames in a group labeled "medium" may be larger than those in a group labeled "small," but smaller than those in a group labeled "large." Designations of "small," "medium," and "large" may be different for different computing applications. Moreover, aspects of the present disclosure are not limited to having three groups of image frames, or any grouping at all.

In some embodiments, the one or more data-perspective metrics may include a moment of a distribution of a per-atom metric. For instance, jitter may be computed as a second moment of a distribution $\{AET_k Ik=0, 1, \ldots\}$, where $AET_k$ denotes an egress time difference (i.e., $ET_{k+i}-ET_k$) between adjacent atoms in a sequence of atoms. Assuming a next atom (k+1) ingresses as soon as a current atom (k) egresses, $ET_k$ may be the same as/$T_{k+i}$, and thus $ET_{k+i}-ET_k$ may be the same as $ET_{k+i}-/T_{k+i}$, which may be a latency value for the next atom (k+1). As such, jitter may be a second moment of a latency distribution. However, it should be appreciated that aspects of the present disclosure are not limited to computing a moment of any particular order, or at all.

At act 310, one or more process-perspective metrics may be computed. In some embodiments, a process-perspective metric may relate to a plurality of atoms processed by a software component. For instance, throughput may be computed for a time window of a selected length (e.g., t seconds) as a number of atoms egressing a software component during that time window.

It should be appreciated that aspects of the present disclosure are not limited to computing both data-perspective and process-perspective metrics. In some embodiments, only one of these types of metrics, or neither type, may be computed.

The inventor has recognized and appreciated that a metric (e.g., latency) may vary across data atoms (e.g., image frames) depending on hardware and/or operating system performance, even if the data atoms are similar (e.g., similarly sized image frames). The inventor has further recognized and appreciated that such variations may be modeled using a random distribution. Accordingly, at act 315, one or more random distribution parameters may be estimated.

In some embodiments, variations in latency may be modeled using a gamma distribution. For example, different groups of image frames may be provided to a software component for processing, where image frames in each group may be similarly sized (e.g., small, medium, and large). Latency values in each size group may be used to estimate a corresponding set of gamma parameters (e.g., a shape parameter k and a scale parameter 0). Thus, multiple sets of parameter values may be obtained, and may be indexed based on the respective data segments (e.g., image size groups).

It should be appreciated that any suitable technique or combination of techniques may be used to estimate parameters of random distributions, including, but not limited to, maximum likelihood estimation.

The inventor has recognized and appreciated that, in some instances, observations may have a multimodal distribution. For example, a processor may overheat and throttle for a period of time, which may cause latency values to exhibit a bimodal distribution. In some embodiments, one or more hypothesis testing techniques may be used to determine an appropriate multimodal distribution. Additionally, or alternatively, one or more operating system events (e.g., a thermal event) may be used to identify one or more observations that correspond to one or more minor modes. Such observations may be analyzed separately, or simply removed.

In some embodiments, additional parameters may be interpolated based on estimated parameters. For instance, a parameter (e.g., a shape or scale parameter for a gamma distribution) may have three values $P_{s'PM}$, and $P_L$, which are estimated, respectively, for small, medium, and large images. One or more curve fitting techniques may be used to identify a function (e.g., a polynomial of degree n for some suitable n) that fits those three values. The function may then be used to determine an interpolated parameter value, for example, for an image size between small and medium, or between medium and large.

It should be appreciated that aspects of the present disclosure are not limited to using any particular random distribution, or any random distribution, to model noise that is introduced by hardware and/or operating system performance variations. In some embodiments, noise may not be modeled explicitly at all.

The inventor has recognized and appreciated that, because the illustrative process uses data collected from running a selected software component on a selected platform (e.g., a selected hardware component and/or a selected operating system), the metrics and/or parameters obtained via the process 300 may or may not be applicable when the software component is run on a different platform. Accordingly, in some embodiments, techniques are provided for making predictions across different platforms.

Figure 4:
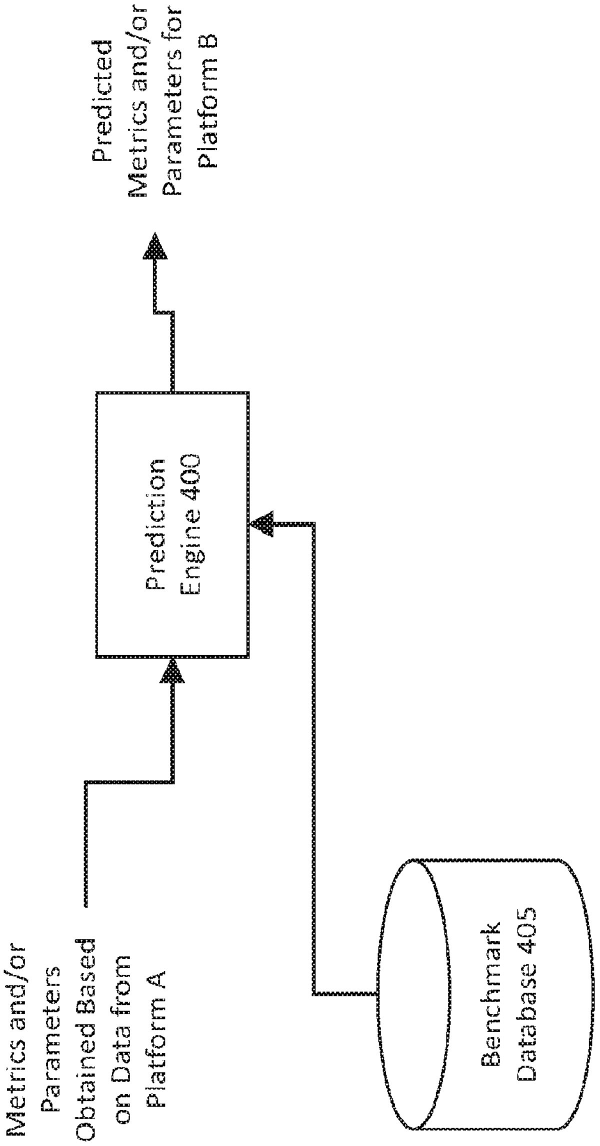
FIG. 4 shows an illustrative prediction engine 400, in accordance with some embodiments.

FIG. 4 shows an illustrative prediction engine 400, in accordance with some embodiments. For instance, one or more metrics and/or parameters obtained based on data collected from a platform A (e.g., using the illustrative process 300 in the example of FIG. 3) may be provided as input to the prediction engine 400. In response, the prediction engine 400 may output predicted metrics and/or parameters for a platform B.

In some embodiments, the prediction engine 400 may access benchmark data about the platform A and/or the platform B from a benchmark database 405. Benchmarking a platform may involve running one or more standardized tasks on the platform and collecting one or more statistics on the platform's performance. Such statistics may allow a meaningful comparison between two different platforms.

For instance, benchmark data may be used to construct a model for a given platform. The model may include a plurality of probability distributions (e.g., Gaussian distributions). In some embodiments, there may be a probability distribution for each data size (e.g., small, medium, or large) and/or each platform state (e.g., normal, throttled, or swapping). One or more parameters for such a probability distribution may be estimated using segmented benchmark data (e.g., latency values for all small images processed when the platform was in a normal state).

Referring again to FIG. 4, a model of the platform A and/or a model of the platform B may be used to predict how a metric or parameter obtained from running a software component on the platform A may change if the same software component is run on the platform B. For instance, the software component may be expressed as a combination of one or more standardized tasks. The one or more standardized tasks may be identified and/or combined based on an analysis of the software component's source code and/or binary code. Additionally, or alternatively, the one or more standardized tasks may be identified and/or combined based on the model of the platform A and/or data collected from running the software component on the platform A. The model of the platform B may then be used to predict one or more metrics and/or parameters for running the software component on the platform B.

In some embodiments, it may be possible to run a software component on the platform B on some input values. For instance, the software component may have a data input (e.g., an image frame, speech frame, etc.) and/or a data-independent input (e.g., a threshold for identifying a matching pattern, a stopping criterion such as a number of iterations, etc.). The data input may have one or more attributes, such as size for an image frame. Likewise, the data-independent input may have one or more attributes, such as magnitude for a threshold. Each attribute may have one or more values, such as small, medium, and large for image frame size, and low and high for threshold magnitude.

In some embodiments, segmented observations may be used to perform estimate one or more parameters of a probability distribution (e.g., a Gaussian distribution). For instance, a mean $_{\mu s}$ and/or a variance $a_s$ may be computed from observations generated by small image frames (regardless of threshold magnitude). Similarly, means $\mu_m, \mu_l$ and/or variances $a_m$, $a_l$ may be computed for medium and large image frames, respectively.

Additionally, or alternatively, a mean $IL_L$ and/or a variance $_{6L}$ may be computed from observations generated by low thresholds (regardless of image frame size). Similarly, a mean $'L_H$ and/or a variance $o^-{}_H$ may be computed for high thresholds.

Additionally, or alternatively, a mean and/or a variance $6_{S,L}$ may be computed from observations generated by combinations of small image frames and low thresholds. Means LI $\sigma_{m,L}$, $\sigma_{l,L}$, $\sigma_{m,H}$, $\sigma_{l,H}$ and/or variances $\mu_{m,L}$, $\mu_{l,L}$, $\mu_{m,H}$, $\mu_{l,H}$ may be computed similarly.

In some embodiments, given a new image frame and a new threshold, a size of the new image frame and/or a magnitude of the new threshold may be determined. The size and/or the magnitude may then be used to look up an appropriate mean and/or an appropriate variance. For instance, if the size is small, and the magnitude is low, then the mean and/or the variance $6_{S,L}$ may be used.

In some instances, a size or a magnitude may be encountered that is different from what has been observed. For instance, the new image frame may have a size that is between small and medium, and the new threshold may have a magnitude that is between low and high. Accordingly, a new mean $p._1$ may be obtained by interpolating between $it_s$ and $it_{n.}$, and/or a new variance $o^-_1$ may be obtained by interpolating between $o^-_s$ and $o^-_m$. Additionally, or alternatively, a new mean $p._2$ may be obtained by interpolating between $IL_L$ and $'L_H$, and/or a new variance $o^-_2$ may be obtained by interpolating between $o^-_i$, and $o^-_H$. Any suitable function may be used for interpolation, including, but not limited to, a linear function.

In some embodiments, a mixture distribution may be used that is generated by interpolation results. For instance, the Gaussian parameters <$it_i$, $o^-_1$> and <$p._2$, $o^-_2$> may be used to generate a mixture distribution from which a latency value may be drawn for the new image frame and the new threshold. However, it should be appreciated that aspects of the present disclosure are not limited to using interpolation, or to generating any mixture distribution.

The inventor has recognized and appreciated that, in some instances, it may be challenging to model an overall random behavior of a computational architecture analytically (e.g., by formulating and solving mathematical equations). For instance, a computational architecture may include a plurality of components that interact with each other. Even if a random behavior of an individual component may be modeled analytically, a dependency between individual components may introduce additional randomness, and it may be challenging to model such additional randomness analytically. Furthermore, even if all individual components and all dependencies may be modeled analytically, it may not be straightforward to combine these lower-level models into a higher-level model for the overall computational architecture. For instance, one or more of the lower-level models may exhibit piecewise behavior, which may render an analytical approach challenging or even impossible.

Nevertheless, the inventor has recognized and appreciated that an overall random behavior of a computational architecture may be synthesized. For instance, given an analytical or computational model of an individual component, and/or an analytical or computational model of a dependency between individual components, the overall random behavior of the computational architecture may be synthesized via simulation. Accordingly, in some embodiments, the illustrative prediction engine 400 in the example of FIG. 4 may use one or more simulation techniques to estimate a random distribution for a metric (e.g., latency) of a computational architecture.

FIGS. 5A-L show illustrative simulation steps for a model of a computational architecture, in accordance with some embodiments. In this example, the model includes a portion of the illustrative graph model 100 of FIG. 1: the frame grabber 105, the region detector 110, the edge from the "nextFrame" port of the frame grabber 105 to the "frame" port of the region detector 110 (also referred to as the edge 105-110), the face detector 115, and the edge from the "detected Regions" port of the region detector 110 to the "faceCandidates" port of the face detector 115 (also referred to as the edge 110-115).

Although not shown in FIGS. 5A-L, a node (e.g., the frame grabber 105, the region detector 110, or the face detector 115) may be labeled with a respective color indicative of a hardware component on which the software component corresponding to the node may be run. In some instances, multiple nodes may be labeled with the same color, indicating that the corresponding software components are run on the same hardware component.

In some embodiments, a simulation run may include a sequence of simulation steps. Each simulation step may include one or more node updates and/or one or more edge updates. A node update may represent a data atom being processed by a software component corresponding to the node, whereas an edge update may represent a data atom being passed from a source software component to a destination software component.

In some embodiments, a data atom may be represented by a simulation token, shown as a star, a diamond, a triangle, a circle, etc. in FIGS. 5A-L. The token may store, or otherwise be associated with, information about the data atom, such as size (e.g., small, medium, or large), complexity (e.g., a number of regions), and/or other attributes (e.g., whether a face is present). Additionally, or alternatively, the token may store, or otherwise be associated with, information about simulation events regarding the data atom, such as ingress time and/or egress time at a node. This information may be used to derive one or more data-perspective metrics, such as per-node latency, end-to-end latency with respect to a sequence of nodes, etc.

The inventor has recognized and appreciated that, in practice, data atoms processed by a computational architecture may not have uniform attributes. For instance, in a computer vision context, a computational architecture may encounter images of various sizes, various complexities, etc. Accordingly, in some embodiments, a simulation may be performed based on user input describing one or more random distributions of data atoms.

As an example, a user input may describe a probability that any given image is small, a probability that any given image is medium, and a probability that any given image is large.

As another example, a user input may describe, for each n E 0, . . . , N (for some suitable number N), a probability that n regions are detected in a given image. Additionally, or alternatively, the user input may describe, for each n, $n_s$, $n_m$, $n_1$ E 0, . . . , N where n=n, $+n_{n„}$+$n_1$, a conditional probability that n, detected regions are small, $n_{n„}$ detected regions are medium, and $n_1$ detected regions are large, given that n regions are detected.

As another example, a user input may describe a probability that a given region is determined to represent a face.

In some embodiments, a simulation token may be generated according to one or more probabilities described in a user input. As an example, a suitable random number generator may be used to select an image size from the set, {small, medium, large}, according to the respective probabilities described in the user input. The selected image size may be ascribed to the token in some suitable manner (e.g., stored in the token, or otherwise associated with the token).

As another example, a suitable random number generator may be used to select a number n E 0, . . . , N of detected regions according to the respective probabilities described in the user input. Additionally, or alternatively, one or more suitable random number generators may be used to select numbers $n_s$, $n_m$, and/or $n_l$ according to the respective conditional probabilities, given the selected number n of detected regions. The selected numbers n, $n_s$, $n_m$, and/or $n_l$ may be ascribed to the token in some suitable manner (e.g., stored in the token, or otherwise associated with the token), as a number of regions, a number of small regions, a number of medium regions, and/or a number of large regions, respectively.

As another example, a suitable random number generator may be used to select an outcome from the set, {face, not face}, according to the respective probabilities described in the user input. The selected outcome may be ascribed to the token in some suitable manner (e.g., stored in the token, or otherwise associated with the token).

In some embodiments, a random distribution may be provided based on empirical data. For instance, in a computer vision context, a random distribution may be determined based on actual frequencies of small, medium, and large images encountered, actual frequencies of numbers of detected regions, detected small regions, detected medium regions, and/or detected large regions, actual frequencies of regions representing faces, etc. Additionally, or alternatively, a user may select a random distribution based on domain expertise.

It should be appreciated that aspects of the present disclosure are not limited to modeling variations in data atoms in any particular manner, or at all. In some embodiments, data atom attributes (e.g., size, complexity, etc.) may be known ahead of time, and may remain unchanged throughout a simulation run.

In some embodiments, a port of a node may be in one of a plurality of different simulation states, such as Vacant and Occupied.

- An Occupied state may indicate that the port is already occupied by a simulation token.
- A Vacant state may indicate that the port is available to hold a simulation token.

It should be appreciated that aspects of the present disclosure are not limited to maintaining any particular state, or any state at all, for a port. For instance, in some embodiments, a port may be modeled as a first-in-first-out (FIFO) buffer that is able to hold L tokens for some suitable L. Thus, a state of the port may be a number between 0 and L.

In some embodiments, an edge from a source port to a destination port may be in one of a plurality of different simulation states, such as Ready, Done, and Idle.

- A Ready state may indicate that the source port is occupied, and the destination port is vacant.
- A Done state may indicate that the source port is vacant, and the destination port is occupied.
- An Idle state may indicate that both the source port and the destination port are vacant.

In some embodiments, a simulation engine may ensure that the source port and the destination port may not be occupied simultaneously. This may reflect an assumption that passing of a token along the edge is instantaneous. However, it should be appreciated that aspects of the present disclosure are not limited to maintaining any particular state, or any state at all, for an edge. For instance, in some embodiments, an edge may be in one of two states, Read and Not Ready. A Ready state may be as described above. A Not Ready state may indicate that the edge is not in a Ready state.

In some embodiments, a node may be in one of a plurality of different simulation states, such as Idle, Ready, Working, Blocked, and Done.

- An Idle state may indicate that one or more input ports of the node are vacant.
- A Ready state may indicate that all input port(s) of the node are occupied, and all output port(s) of the node are vacant. An ingress node may have no input port, and may be in a Ready state when all output port(s) are vacant.
- Similarly, an egress node may have no output port, and may be in a Ready state when all input port(s) are occupied.
- A Working state may indicate that one or more simulation tokens have been ingested by the node. The one or more simulation tokens may remain at one or more respective input ports until the node has finished processing the one or more simulation tokens.
- A Blocked state may indicate that all input port(s) of the node are occupied, and one or more output ports of the node are also occupied. An ingress node may have no input port, and may be in a Blocked state when one or more output ports are occupied. By contrast, an egress node may have no output port, and may never be in a Blocked state.
- A Done state may indicate that the node has finished processing one or more simulation tokens, and that the one or more simulation tokens should be cleared from one or more respective input ports until the node has finished processing the one or more simulation tokens.

It should be appreciated that aspects of the present disclosure are not limited to maintaining any particular state, or any state at all, for a node. For instance, in some embodiments, there may be a Starved state, which may indicate that at least one input port of the node is occupied, but at least one other input port of the node is vacant. In such an embodiment, an Idle state may indicate that every input port of the node is vacant.

In some embodiments, all nodes and edges may be initialized to an Idle state. As a simulation run begins, an ingress node may be updated to a Ready state. For instance, in the example of FIG. 5A, the frame grabber 105 is updated from Idle to Ready in an initial simulation step, indicating that a token (shown as a star) is ready to be ingested. Additionally, or alternatively, a simulation event may be recorded to indicate that the frame grabber 105 is ready at simulation time 0.

Figure 5A:
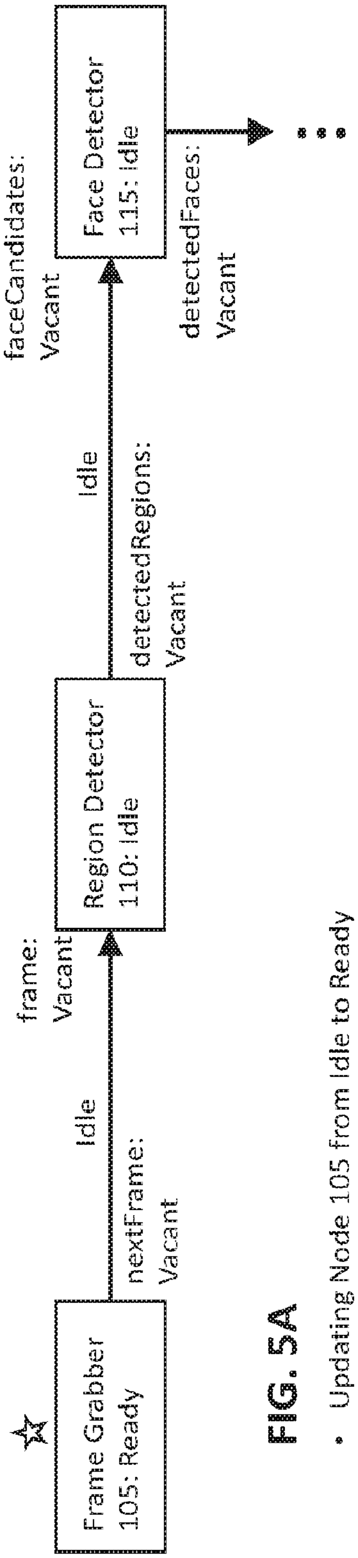
FIGS. 5A-L show illustrative simulation steps for a model of a computational architecture, in accordance with some embodiments.

Because all edges are in an Idle state, no edge update is performed at the simulation step in the example of FIG. 5A.

In some embodiments, a node that is in a Ready state may be selected for activation at a subsequent simulation step. If there are multiple nodes that are in a Ready state, a node with an earliest ready time may be selected for activation.

In the example of FIG. 5A, the frame grabber 105 is the only node in a Ready state, and therefore is selected for activation. A global clock may be updated to the ready time of the frame grabber 105 (e.g., simulation time 0).

In some embodiments, a node may have one or more associated random distributions, such as a random distribution for a per-node metric (e.g., latency). Such random distributions may be indexed and/or retrieved based on static and/or dynamic variables. A value of a static variable may be known before a simulation run, and/or may remain unchanged throughout the simulation run. For instance, an algorithm name, an implementation name, one or more parameters (e.g., a threshold for identifying a matching pattern, a stopping criterion such as a number of iterations, etc.), and/or hardware information (e.g., device type and/or device identifier) may be mapped to a corresponding random distribution of latency values. By contrast, a value of a dynamic variable may be determined, and/or may change, during a simulation run. For instance, a platform state (e.g., normal, throttled, or swapping), an image size (e.g., small, medium, or large), and/or an image complexity (e.g., a number of regions) may be mapped to a corresponding random distribution of latency values.

Referring again to FIG. 5A, one or more static variable values of the frame grabber 105 (e.g., algorithm name, implementation name, one or more parameters, hardware information, etc.) may be used to map the frame grabber 105 to a plurality of random distributions corresponding, respectively, to a plurality of platform states (e.g., normal, throttled, and swapping). For instance, there may be a first latency distribution corresponding to a normal state, a second latency distribution corresponding to a throttled state, and a third latency distribution corresponding to a swapping state.

In some embodiments, a platform state may be determined based on an overall simulation state. For instance, a simulation engine may determine how many tokens are present (e.g., occupying a port or an internal queue), a size of each such token, etc. This information may be used to estimate a memory usage, which in turn may be used to determine whether a swapping state is applicable.

In some embodiments, a latency distribution corresponding to the platform state may be used to generate a latency value (e.g., using a suitable random number generator), and the frame grabber 105 may be updated from a Ready state to a Blocked state, indicating that the token (shown as a star) has egressed with the latency value. This is shown in FIG. 5B.

Additionally, or alternatively, a simulation event may be recorded to indicate an egress time for the token from the frame grabber 105. The egress time may be determined based on the ready time of the frame grabber 105 and the latency value.

As a result of the token (shown as a star) egres sing the frame grabber 105, the "nextFrame" port may, in some embodiments, be updated from a Vacant state to an Occupied state. In turn, the edge 105-110 may be updated from an Idle state to a Ready state.

Figure 5B:
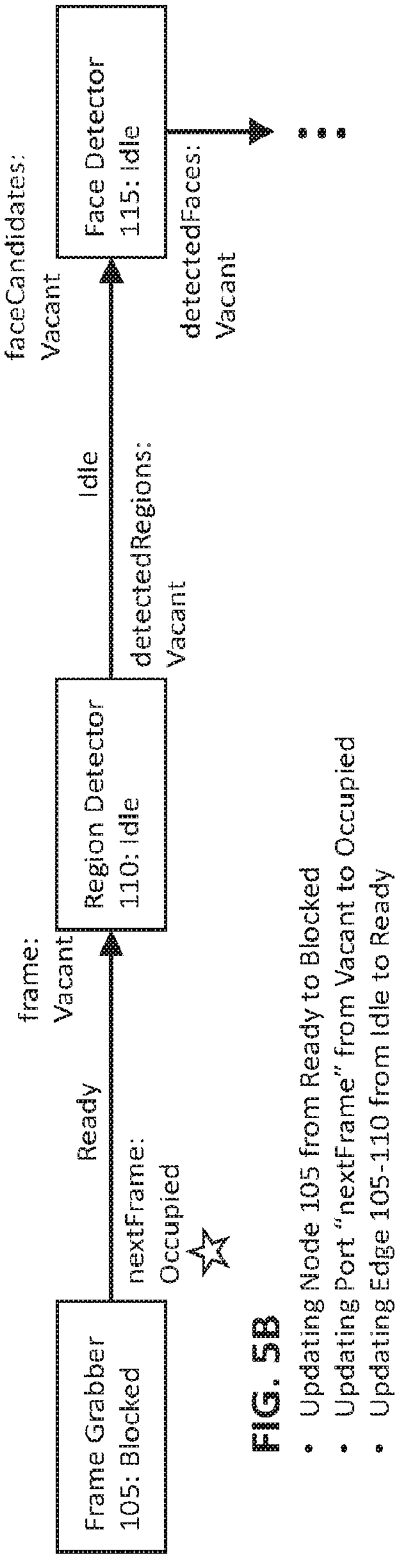
Figure 5C:
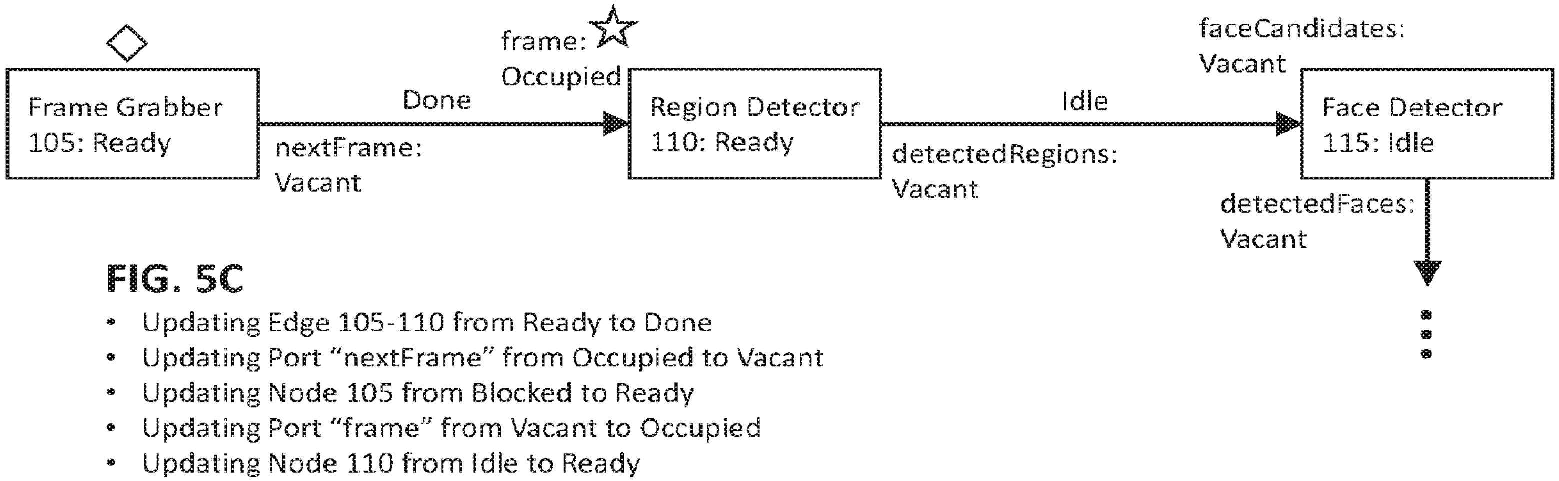

Because the edge 105-110 is now in a Ready state, an edge update is performed at the simulation step in the example of FIG. 5B. Accordingly, the edge 105-110 may be updated from a Ready state to a Done state, indicating that the token (shown as a star) has been passed from the "nextFrame" port of the frame grabber 105 to the "frame" port of the region detector 110. This is shown in FIG. 5C.

As a result of the token (shown as a star) being passed from the "nextFrame" port of the frame grabber 105 to the "frame" port of the region detector 110, the "nextFrame" port may, in some embodiments, be updated from an Occupied state to a Vacant state. In turn, the frame grabber 105 may be updated from a Blocked state to a Ready state. Because the frame grabber 105 is an ingress node, another token (shown as a diamond) may become ready to be ingested.

Additionally, or alternatively, the "frame" port of the region detector 110 may be updated from a Vacant state to an Occupied state. In turn, the region detector 110 may be updated from an Idle state to a Ready state. Additionally, or alternatively, a simulation event may be recorded to indicate a ready time for the region detector 110. In some embodiments, passing of a token along an edge may be considered instantaneous, so that a ready time for the region detector 110 may be the same as the egress time for the token (shown as a star) from the frame grabber 105.

In some embodiments, if an ingress node (e.g., the frame grabber 105) and an internal node (e.g., the region detector 110) become ready simultaneously, the ingress node may be activated first. However, in the example of FIG. 5C, activating the frame grabber 105 first may result in the other token (shown as a diamond) egres sing, which may in turn result in both the "nextFrame" port of the frame grabber 105 and the "frame" port of the region detector 110 being occupied. This may violate an invariant that a source port and a destination port of an edge may not be occupied simultaneously.

Figure 5D:
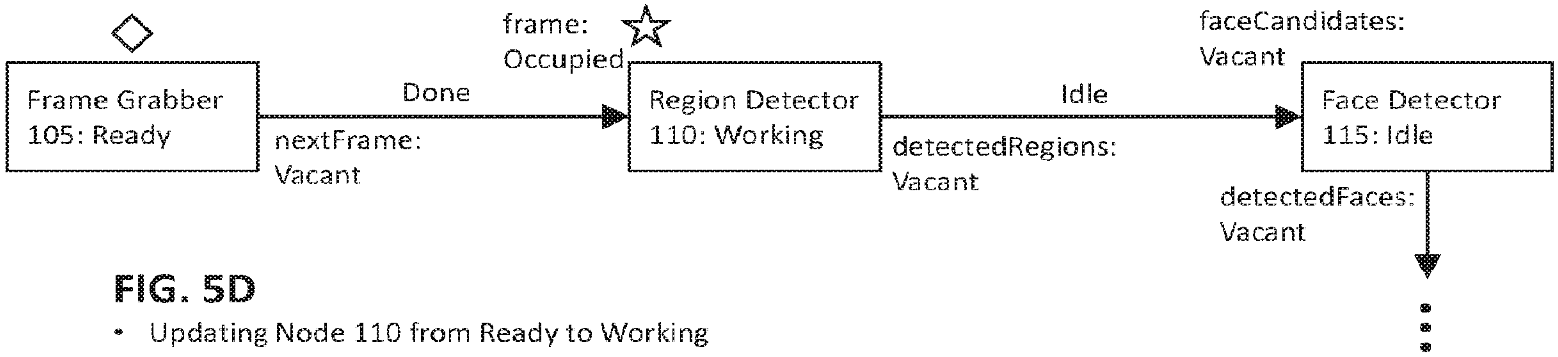

Accordingly, in some embodiments, the region detector 110 may be activated first. As a result, the region detector 110 may be updated from a Ready state to a Working state, indicating that the token (shown as a star) has been ingested. This is shown in FIG. 5D. A global clock may be updated to the ready time of the frame grabber 105 (e.g., the egress time for the token from the frame grabber 105).

Because the edge 105-110 is in a Done state, and the edge 110-115 is in an Idle state, no edge update is performed at the simulation step in the example of FIG. 5D.

In some embodiments, one or more static variable values of the region detector 110 (e.g., algorithm name, implementation name, one or more implementation parameters, hardware information, etc.) may be used to map the region detector 110 to a plurality of random distributions of latency values. These random distributions may correspond, respectively, to different combinations of platform state (e.g., normal, throttled, or swapping), image size (e.g., small, medium, or large), image complexity (e.g., a number n of regions), etc.

In some embodiments, a platform state may be determined based on an overall simulation state (e.g., how many tokens are present, a size of each such token, etc.). Additionally, or alternatively, an image size may be determined based on information associated with the token (shown as a star). Additionally, or alternatively, an image complexity may be determined based on information associated with the token (shown as a star). Accordingly, a latency distribution that corresponds to the platform state, the image size, and the image complexity may be used to generate a latency value (e.g., using a suitable random number generator).

In some embodiments, a sum of Gaussians (SoG) distribution (referred to as a Gaussian mixture distribution) may be used to model variations in a dependent variable such as per-node latency. There may be one or more independent variables corresponding, respectively, to one or more static variables (e.g., algorithm name, implementation name, one or more implementation parameters, hardware information, etc.) and/or one or more dynamic variables (e.g., platform state, image size, image complexity, etc.). Multi-dimensional observations (i.e., multiple independent variables) may be projected down to multiple one-dimensional observations (i.e., just one independent variable), which may be used to estimate respective means and variances.

In some embodiments, the token (shown as a star) may have associated information indicating a number n of regions. As discussed above, n may be selected (e.g., using a suitable random number generator) according to a random distribution described in a user input. If n is zero, the region detector 110 may be updated from a Working state in the example of FIG. 5D to an Idle state, without any token egressing.

Figure 5E:
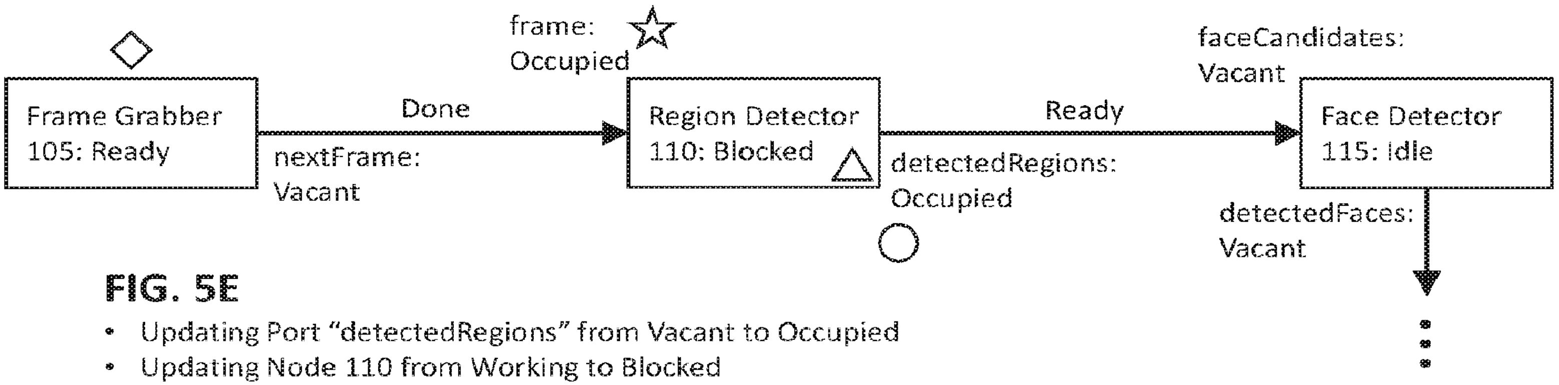

If n is greater than zero, a new token (shown as a circle) may egress with the latency value. The new token may represent a region detected from an image represented by the original token (shown as a star). This is shown in FIG. 5E.

Additionally, or alternatively, a simulation event may be recorded to indicate an egress time for the new token (shown as a circle) from the region detector 110. The egress time may be determined based on the ready time of the region detector 110 and the latency value.

In some embodiments, a counter may be maintained to keep track of how many new token(s) have egressed from the region detector 110. The counter may be initialized to n, and may be decremented each time a new token egresses. Additionally, or alternatively, the region detector 110 may have a buffer that is able to hold up to N new tokens, where N is the maximum number of regions described in a user input. In the example of FIG. 5E, n equals 2, and a second new token (shown as a triangle) is held in a buffer in the region detector 110.

In some embodiments, the original token (shown as a star) may have associated information indicating a number n, of small regions, a number $n_{n.}$, of medium regions, and a number $n_1$ of large regions. Of the n new tokens egres sing the region detector 110, n, may be designated as small, $n_{n.}$, may be designated as medium, and $n_1$ may be designated as large.

As a result of the first new token (shown as a circle) egressing the region detector 110, the "detectedRegions" port may, in some embodiments, be updated from a Vacant state to an Occupied state. In turn, the region detector 110 may be updated from a Working state to a Blocked state, and the edge 110-115 may be updated from an Idle state to a Ready state.

Because the edge 110-115 is now in a Ready state, an edge update is performed at the simulation step in the example of FIG. 5E. Accordingly, the edge 110-115 may be updated from a Ready state to a Done state, indicating that the first new token (shown as a circle) has been passed from the "detectedRegions" port of the region detector 110 to the "faceCandidates" port of the face detector 115. This is shown in FIG. 5F.

As a result of the first new token (shown as a circle) being passed from the "detectedRegions" port of the region detector 110 to the "faceCandidates" port of the face detector 115, the "detectedRegions" port may, in some embodiments, be updated from an Occupied state to a Vacant state. In turn, the Region Detector 110 may be updated from a Blocked state back to a Working state.

Additionally, or alternatively, the "faceCandidates" port may be updated from a Vacant state to an Occupied state. In turn, the face detector 115 may be updated from an Idle state to a Ready state. Additionally, or alternatively, a simulation event may be recorded to indicate a ready time for the face detector 115. In some embodiments, passing of a token along an edge may be considered instantaneous, so that a ready time for the face detector 115 may be the same as the egress time for the first new token (shown as a circle) from the region detector 110.

Figure 5F:
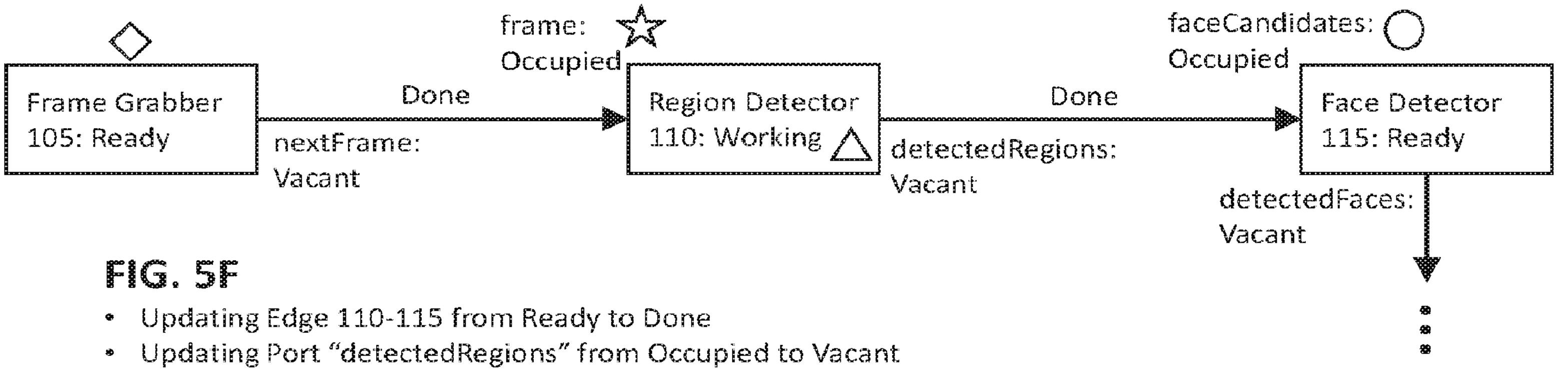

In the example of FIG. 5F, the internal buffer of the region detector 110 may still hold the second new token (shown as a triangle). However, allowing the second new token (shown as a triangle) to egress may result in both the "detectedRegions" port of the region detector 110 and the "faceCandidates" of the face detector 115 being occupied. This may violate an invariant that a source port and a destination port of an edge may not be occupied simultaneously.

Moreover, although the frame grabber 105 may have an earlier read time than the face detector 115, activating the frame grabber 105 may result in both the "nextFrame" port of the frame grabber 105 and the "frame" port of the region detector 110 being occupied. This may also violate the above-described invariant.

Figure 5G:
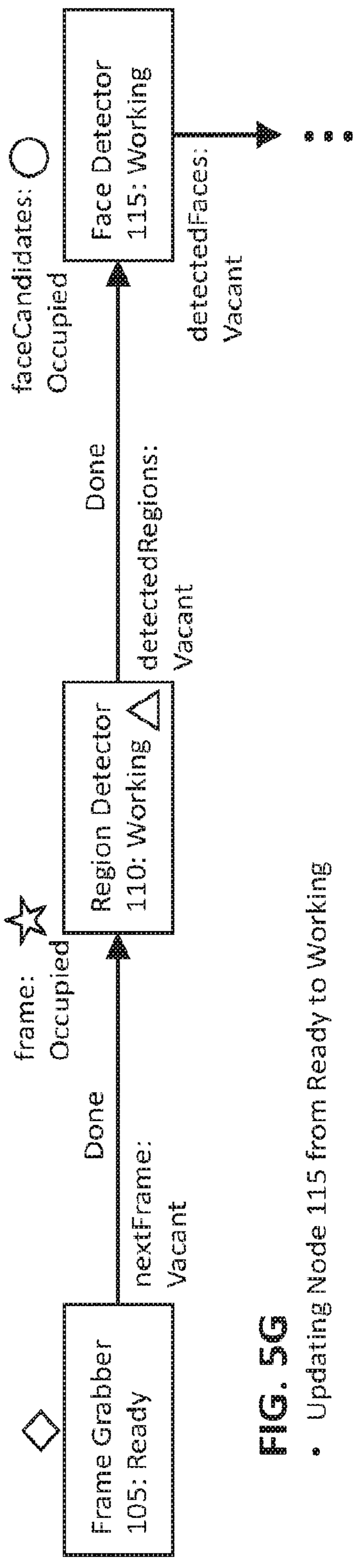

Accordingly, in some embodiments, the face detector 115 may be activated. As a result, the face detector 115 may be updated from a Ready state to a Working state, indicating that the token (shown as a circle) has been ingested. This is shown in FIG. 5G. A global clock may be updated to the ready time of the face detector 115. This ready time may be the same as that of the egress time for the first new token (shown as a circle) from the region detector 110.

Because both the edge 105-110 and the edge 110-115 are in a Done state, no edge update is performed at the simulation step in the example of FIG. 5G.

In some embodiments, the first new token (shown as a circle) may have associated information indicating whether a face is present. As discussed above, whether a face is present in a given region may be determined (e.g., using a suitable random number generator) according to a random distribution described in a user input. When the first new token (shown as a circle) is subsequently ingested by the face detector 115, the information indicating whether a face is present may be used to determine whether a new token representing a detected face may egress face detector 115.

In the example of FIG. 5G, it is determined that the first new token (shown as a circle) does not represent a region in which a face is present. Accordingly, the face detector 115 may be updated from a Working state to a Done state, without any new token egressing. This is shown in FIG. 5H.

Figure 5H:
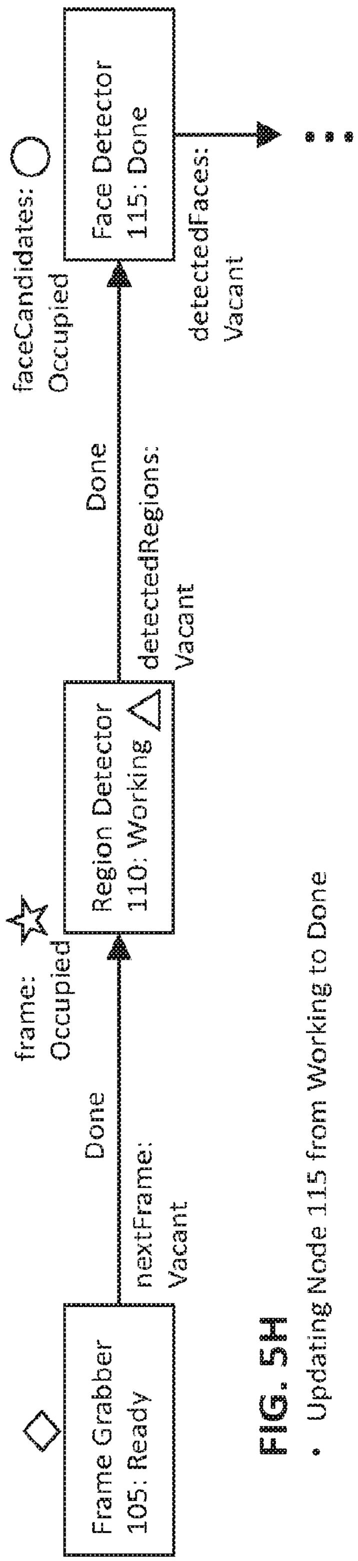

Because both the edge 105-110 and the edge 110-115 are still in a Done state, no edge update is performed at the simulation step in the example of FIG. 5H.

Figure 5I:
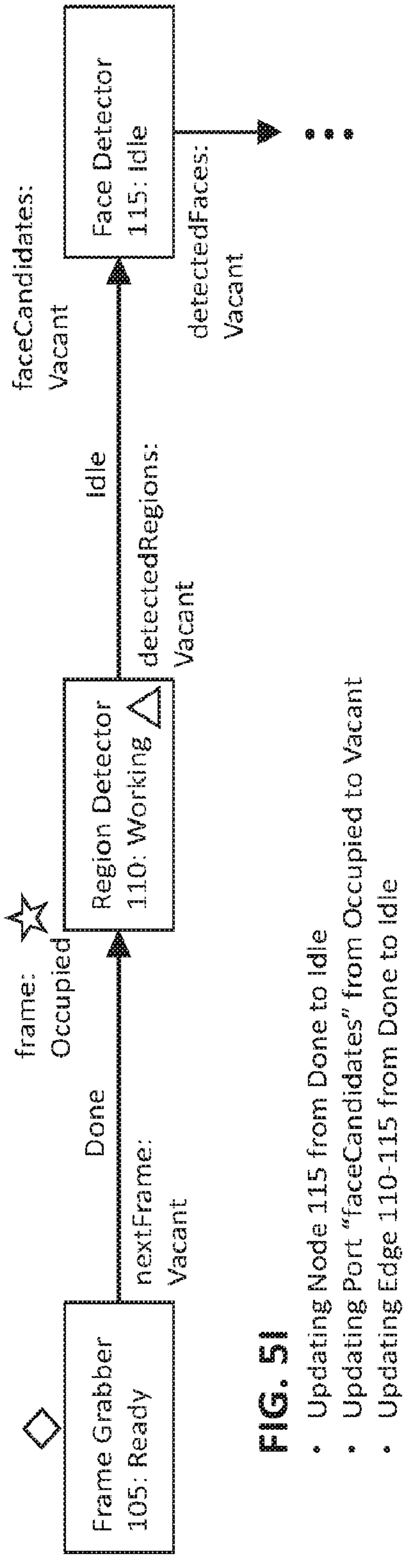

Since the face detector 115 has finished processing the first new token (shown as a circle), the face detector 115 may be updated from a Done state to an Idle state. This is shown in FIG. 5I. Additionally, or alternatively, the "faceCandidates" port of the face detector 115 may be updated from an Occupied state to a Vacant state, clearing the first new token (shown as a circle). In turn, the edge 110-115 may be updated from a Done state to an Idle state.

Since the "faceCandidates" port of the face detector 115 has been cleared, the second new token (shown as a triangle) may egress the region detector 110 without violating the above-described invariant. This is shown in FIG. 5J.

In some embodiments, when the counter of remaining new tokens reaches zero, the region detector 110 may be updated from a Working state to a Done state. Additionally, or alternatively, the region detector 110 may be updated from a Working state to a Done state when the internal buffer holding new tokens is emptied.

Figure 5J:
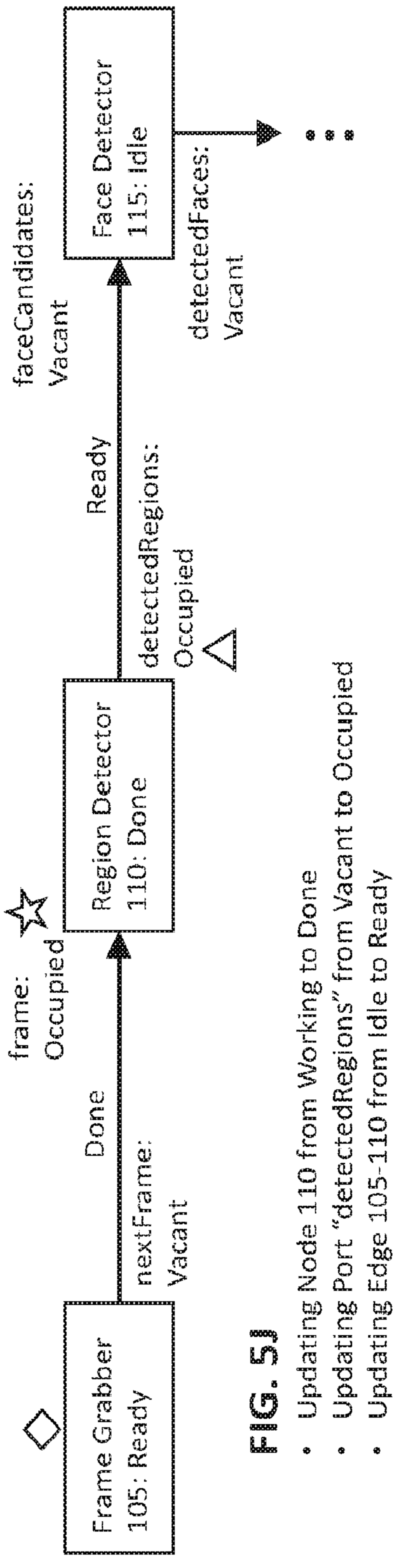

In the example of FIG. 5J, the second new token (shown as a triangle) has egressed with the latency value. The second new token (shown as a triangle) may represent a second region detected from an image represented by the original token (shown as a star). A simulation event may be recorded to indicate an egress time for the second new token (shown as a triangle) from the region detector 110. This egress time may be the same as that of the egress time for the first new token (shown as a circle).

Like the first new token (shown as a circle), the second new token (shown as a triangle) may have associated information indicating whether a face is present. In some embodiment, the outcome for the first new token and the outcome for the second new token may be drawn independently from the same random distribution.

As a result of the second new token (shown as a triangle) egressing the region detector 110, the "detectedRegions"

port of the region detector 110 may, in some embodiments, be updated from a Vacant state to an Occupied state. In turn, the edge 110-115 may be updated from an Idle state to a Ready state.

Figure 5K:
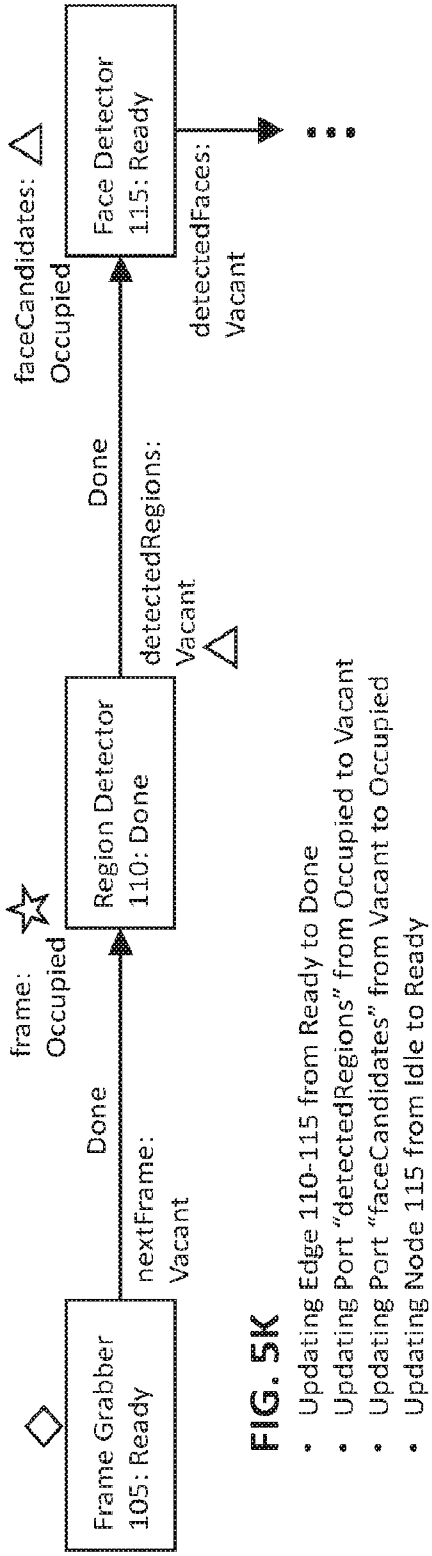

Because the edge 110-115 is now in a Ready state, an edge update is performed at the simulation step in the example of FIG. 5J. Accordingly, the edge 110-115 may be updated from a Ready state to a Done state, indicating that the second new token (shown as a triangle) has been passed from the "detectedRegions" port of the region detector 110 to the "faceCandidates" port of the face detector 115. This is shown in FIG. 5K.

As a result of the second new token (shown as a triangle) being passed from the "detectedRegions" port of the region detector 110 to the "faceCandidates" port of the face detector 115, the "detectedRegions" port may, in some embodiments, be updated from an Occupied state to a Vacant state. In turn, the Region Detector 110 may be updated from a Blocked state back to a Working state.

Additionally, or alternatively, the "faceCandidates" port may be updated from a Vacant state to an Occupied state. In turn, the face detector 115 may be updated from an Idle state to a Ready state. Additionally, or alternatively, a simulation event may be recorded to indicate a ready time for the face detector 115. In some embodiments, since the second new token (shown as a triangle) is processed after the first new token (shown as a circle), a ready time for the face detector 115 may be the egress time for the second new token (shown as a triangle) from the region detector 110 plus a latency value for the first new token (shown as a circle).

In some embodiments, the latency value for the first new token (shown as a circle) may be generated according to a latency distribution selected based on one or more static variable values of the face detector 115, a platform state, an image size associated with the first new token (shown as a circle), an image complexity associated with the first new token (shown as a circle), etc. This may be done in a manner that is similar to determining the latency value for the original token (shown as a star) at the region detector 110.

Figure 5L:
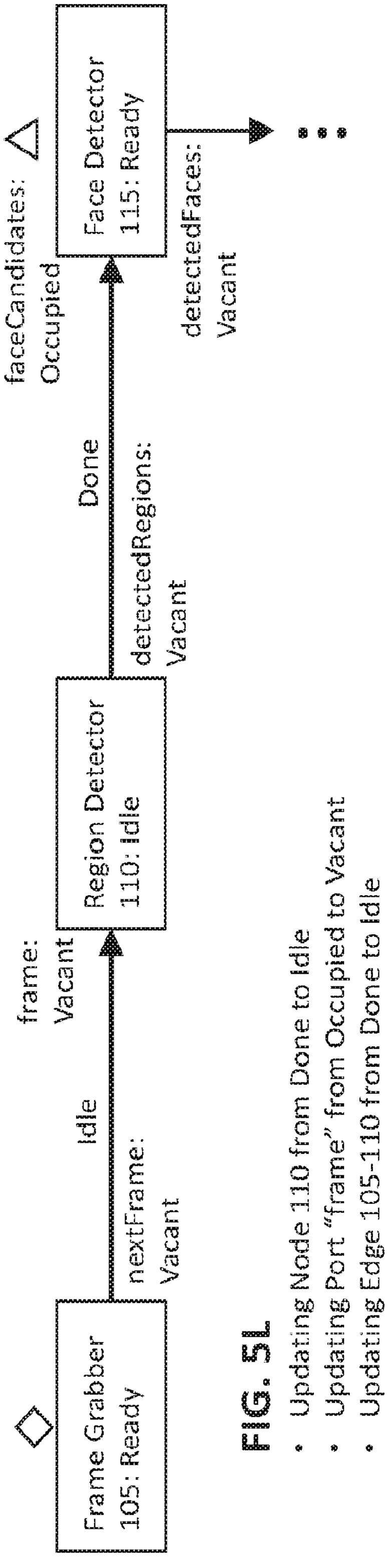

Since the region detector 110 has finished processing the original token (shown as a star), the region detector 110 may be updated from a Done state to an Idle state. This is shown in FIG. 5L. Additionally, or alternatively, the "frame" port of the region detector 110 may be updated from an Occupied state to a Vacant state, clearing the original token (shown as a star). In turn, the edge 105-110 may be updated from a Done state to an Idle state.

Although various details of implementation are described in connection with FIGS. 5A-L, it should be appreciated that such details are provided solely for purposes of illustration. Aspects of the present disclosure are not limited to any particular manner of implementation. For instance, in some embodiments, only one active node may be allowed in each simulation step, whereas multiple active edges may be allowed.

In some embodiments, instead of processing the second new token (shown as a triangle) after the first new token (shown as a circle), thereby increasing an overall latency, the face detector 115 may be replicated to process the two new tokens in parallel. Thus, the graph model 100 may be modified during a simulation to include a new node representing a new instance of the face detector 115. Additionally, or alternatively, the "detectedRegions" port of the region detector 110 may be replicated. The new "detectedRegions" port may be connected to an input port of the new node representing the new instance of the face detector 115. The second new token (shown as a triangle) may egress via the new "detected Regions" port.

In some embodiments, a buffer may be provided to store one or more tokens that result from a single token that has ingressed. For instance, if multiple faces are detected from a single image frame, identifiers of the detected faces may be buffered at the illustrative classifier 130 in the example of FIG. 1. The classifier 130 may be an egress node, and the buffered identifiers may egress together.

In some embodiments, a simulation run may proceed until a stopping condition is satisfied. For instance, a simulation run may proceed until a selected number of simulation steps have been carried out. Such a number may be determined in any suitable manner (e.g., indicated in a user input).

Figure 6A:
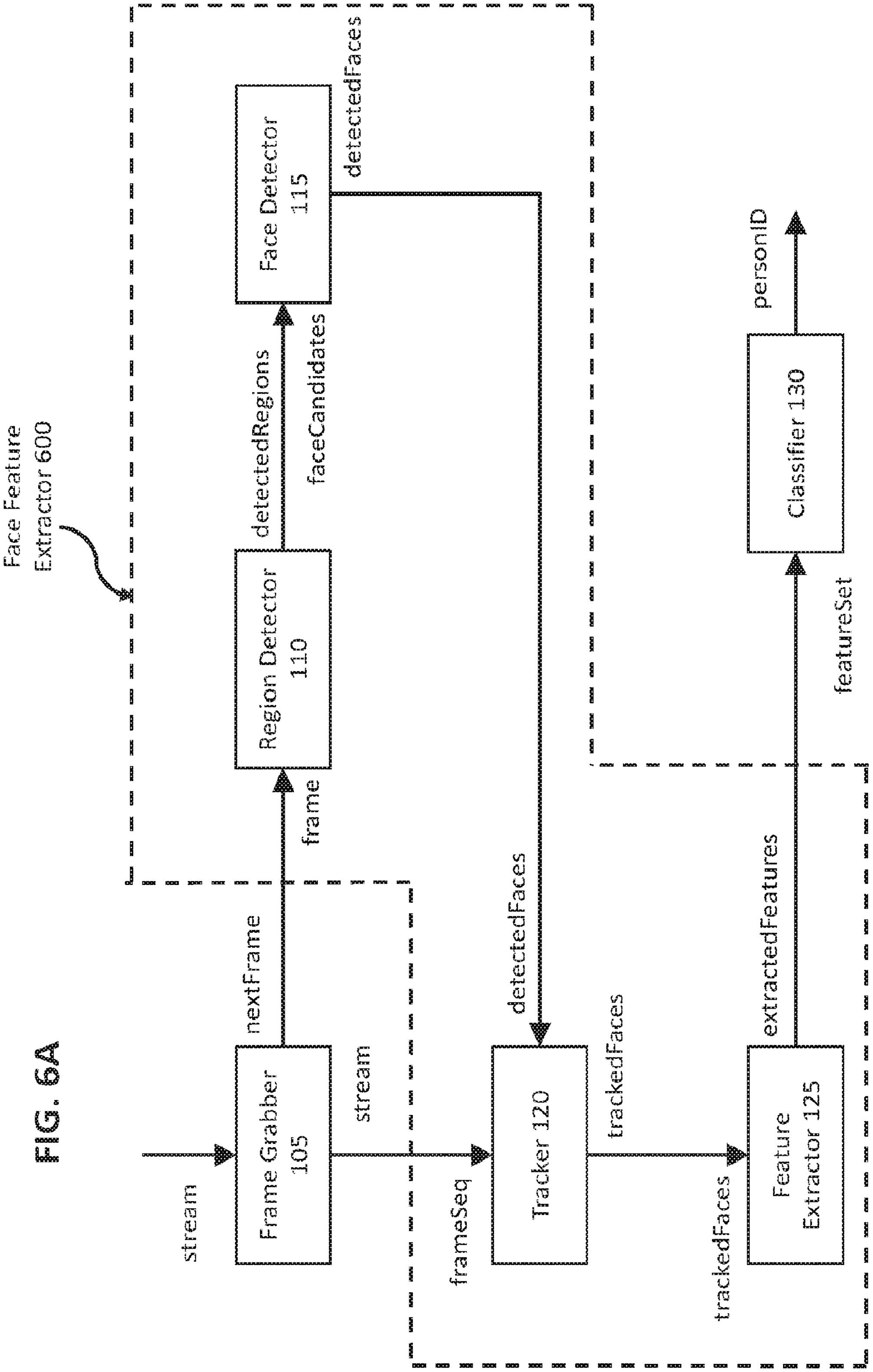
FIGS. 6A-B show an illustrative face feature extractor 600, in accordance with some 10 embodiments.
Figure 6B:
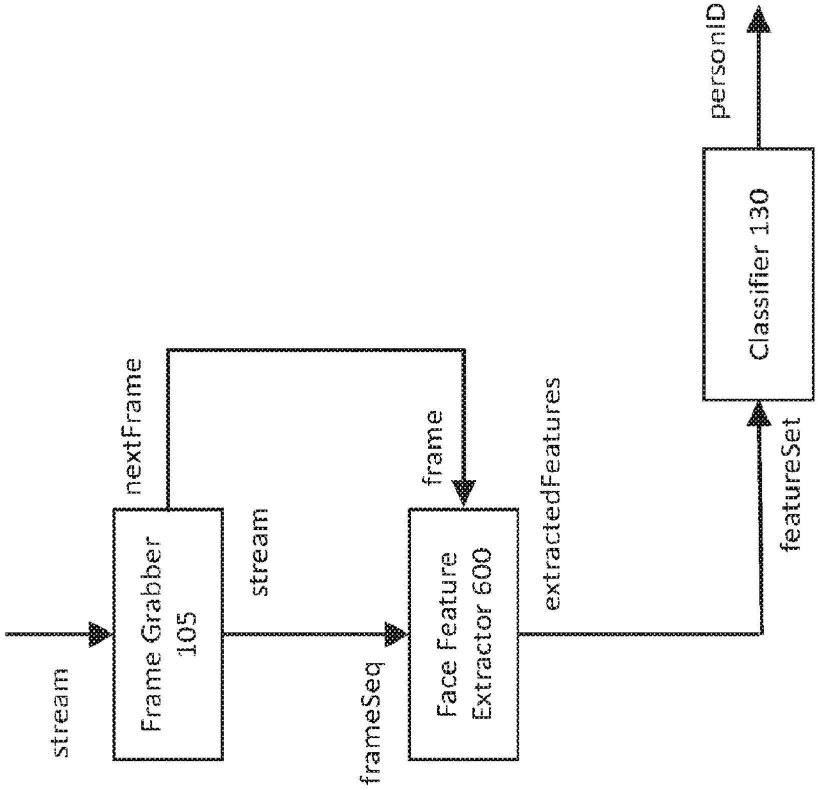

FIGS. 6A-B show an illustrative face feature extractor 600, in accordance with some embodiments. The face feature extractor 600 may be described recursively, for example, as a composite of the illustrative region detector 110, the illustrative face detector 115, the illustrative tracker 120, and the illustrative feature extractor 125 in the example of FIG. 1.

In the example of FIGS. 6A-B, the face feature extractor 600 has two input ports: the "frame" port (of the region detector 110) and the "frameSeq" port (of the tracker 120). Similarly, the face feature extractor 600 has one output port: the "extractedFeatures" port of the feature extractor 125.

In some embodiments, a computational architecture may include a path from an ingress node to an egress node with no branching, so that every atom entering the ingress node may be processed by a same sequence of one or more components in the path, and may eventually exit through the egress node. For instance, the frame grabber 105, the region detector 110, the face detector 115, the tracker 120, the feature extractor 125, and the classifier 130 may form a first path. Similarly, the frame grabber 105, the tracker 120, the feature extractor 125, and the classifier 130 may form a second path.

A collection of one or more such paths is sometimes referred to as a pipeline. The inventor has recognized and appreciated that one or more of the techniques described herein may be used to model and/or analyze a pipeline in an efficient manner. However, it should be appreciated that aspects of the present disclosure are not limited to any particular type of computational architecture.

In some embodiments, an end-to-end metric for the face feature extractor 600 may be computed based on recorded information regarding one or more per-node metrics for the region detector 110, the face detector 115, the tracker 120, and the feature extractor 125. For instance, given an input image (e.g., represented by the token shown as a star in the example of FIGS. 5A-L), recorded per-node latencies for the input image and/or one or more derived images (e.g., represented by the token shown as a circle and/or the token shown as a triangle in the example of FIGS. 5A-L) may be used to compute an end-to-end latency for the input image. In some embodiments, some derived images may be processed in parallel, and a maximum of the per-node latencies may be used. Additionally, or alternatively, some derived images may be processed in series, and a sum of the per-node latencies may be used.

In some embodiments, a synthesized random distribution may be obtained for an end-to-end metric based on values computed for multiple data atoms processed during a simulation run. For instance, a histogram of end-to-end latency values may be generated, and a random distribution may be estimated based on the histogram. Any suitable type of random distribution may be estimated, such as a gamma distribution, a sum of Gaussians distribution, etc.

Illustrative configurations of various aspects of the present disclosure are provided below.

A1. A computer-implemented method for analyzing a random behavior of a computational architecture, the method comprising acts of: analyzing source code of the computational architecture to identify at least one callable object that is likely to impact a selected metric of the computational architecture; analyzing binary code of the computational architecture to determine whether the at least one callable object is reachable during execution of the binary code; and generating a tracepoint to be inserted into the binary code, wherein: the tracepoint, when executed by a processor, causes the processor to collect a selected type of information during execution of the binary code.

A2. The method of configuration AI , further comprising: inserting the tracepoint into the binary code.

A3. The method of configuration A2, wherein: the tracepoint is inserted into the binary code by a system loader.

A4. The method of configuration AI, wherein: generating the tracepoint comprises: selecting at least one argument from one or more arguments accepted by the at least one callable object; and generating the tracepoint to collect information on the at least one argument.

A5. The method of configuration A4, wherein: the at least one argument is selected based on a type of the at least one argument.

A6. The method of configuration A4, wherein: the at least one argument is selected based on information obtained from an abstract syntax tree produced by a compiler.

A7. The method of configuration A4, wherein: the tracepoint is generated to collect at least one selected characteristic of the at least one argument.

A8. The method of configuration A7, wherein: the at least one selected characteristic comprises a characteristic that is likely to impact the selected metric of the computational architecture.

B1. A computer-implemented method for simulating an overall random behavior of a computational architecture, the method comprising acts of: generating a first outcome according to a first random distribution associated with a first software component of the computational architecture; and generating a second outcome according to a second random distribution associated with a second software component of the computational architecture, wherein: the second software component receives at least one input that is dependent on an output of the first software component; and the second random distribution is determined based on the first outcome generated according to the first random distribution.

B2. The method of configuration B1, wherein: the at least one input to the second software component comprises the output of the first software component.

B3. The method of configuration B2, wherein: the first outcome generated according to the first random distribution indicates a size of the output of the first software component; and the second outcome generated according to the second random distribution indicates a latency of the second software component.

B4. The method of configuration B3, wherein: the second software component is associated with a plurality of random distributions of latency values; the plurality of random distributions of latency values correspond, respectively, to a plurality of input sizes; and the second random distribution is selected, based on the size of the output of the first software component, from the plurality of random distributions of latency values.

B5. The method of configuration B1, wherein: the first random distribution is determined based on at least one user input.

B6. The method of configuration B1, wherein: the first outcome generated according to the first random distribution indicates a number of outputs of the first software component.

C1. A computer-implemented method for estimating a random distribution for an overall metric for a composite node, the composite node comprising a plurality of nodes, the method comprising acts of: for each data atom of a plurality of data atoms being input to the composite node: for each node of the plurality of nodes, generating at least one value for a per-node metric with respect to the data atom; and generating, based on the per-node metric values of the plurality of nodes, a value for the overall metric with respect to the data atom; and estimating, based on the overall metric values with respect to the plurality of data atoms, at least one parameter of the random distribution for the overall metric for the composite node.

C2. The method of configuration CI, wherein: the overall metric comprises an overall latency; and for at least one node of the plurality of nodes, the per-node metric comprises a per-node latency.

C3. The method of configuration CI, wherein: the plurality of data atoms comprise a first data atom; the plurality of nodes comprise one or more first nodes and a second node; and the per-node metric value of the second node with respect to the first data atom comprises a per-node metric value of the second node for a second data atom that has resulted from the one or more first nodes processing the first data atom.

C4. The method of configuration C3, wherein: the first data atom comprises an image frame; and the second data atom comprises at least one face detected from the image 20 frame.

C5. The method of configuration C3, wherein: the random distribution for the overall metric for the composite node comprises a first random distribution; and the per-node metric value of the second node for the second data atom is generated according to a second random distribution selected based on an attribute value of the second data atom.

C6. The method of configuration C5, wherein: the attribute value of the second data atom comprises a size or a complexity of the second data atom.

C7. The method of configuration C5, wherein: the attribute value of the second data atom is selected according to a third random distribution.

C8. The method of configuration C7, wherein: the third random distribution is based on user input.

C9. The method of configuration C3, wherein: the random distribution for the overall metric for the composite node comprises a first random distribution; and the per-node metric value of the second node for the second data atom is generated according to a second random distribution selected based on a platform state of a simulation run.

C10. The method of configuration C3, wherein: the random distribution for the overall metric for the composite node comprises a first random distribution; and the per-node metric value of the second node for the second data atom is generated according to a second random distribution selected based on a value of a static variable of the second node.

C11. The method of configuration CI, wherein: estimating the at least one parameter of the random distribution for the overall metric comprises: generating a histogram based on the overall metric values with respect to the plurality of data atoms; and estimating the at least one parameter based on the histogram.

D1. A computer-implemented method for simulating an overall random behavior of a computational architecture, the computation architecture comprising a first node and a second node, the method comprising acts of: labeling the first node with a first color indicative of a first hardware component; simulating, based on a state of the first hardware component, a random behavior of the first node; labeling the second node with a second color indicative of a second hardware component; simulating, based on a state of the second hardware component, a random behavior of the second node; and simulating, based on the random behavior of the first node and the random behavior of the second node, the overall random behavior of the computational architecture.

D2. The method of configuration D1, further comprises acts of: rendering the first node with the first color indicative of the first hardware component; and rendering the second node with the second color indicative of the second hardware component.

E1. A system comprising: at least one computer processor; and at least one computer-readable storage medium having stored thereon instructions which, when executed, program the at least one computer processor to perform the method of any of the configurations AI-A8, B1-B6, CI-Cul, and DI-D2.

FI. At least one computer-readable storage medium having stored thereon instructions which, when executed, program at least one processor to perform the method of any of the configurations AI-A8, B1-B6, CI-Cul, and DI-D2.

Figure 7:
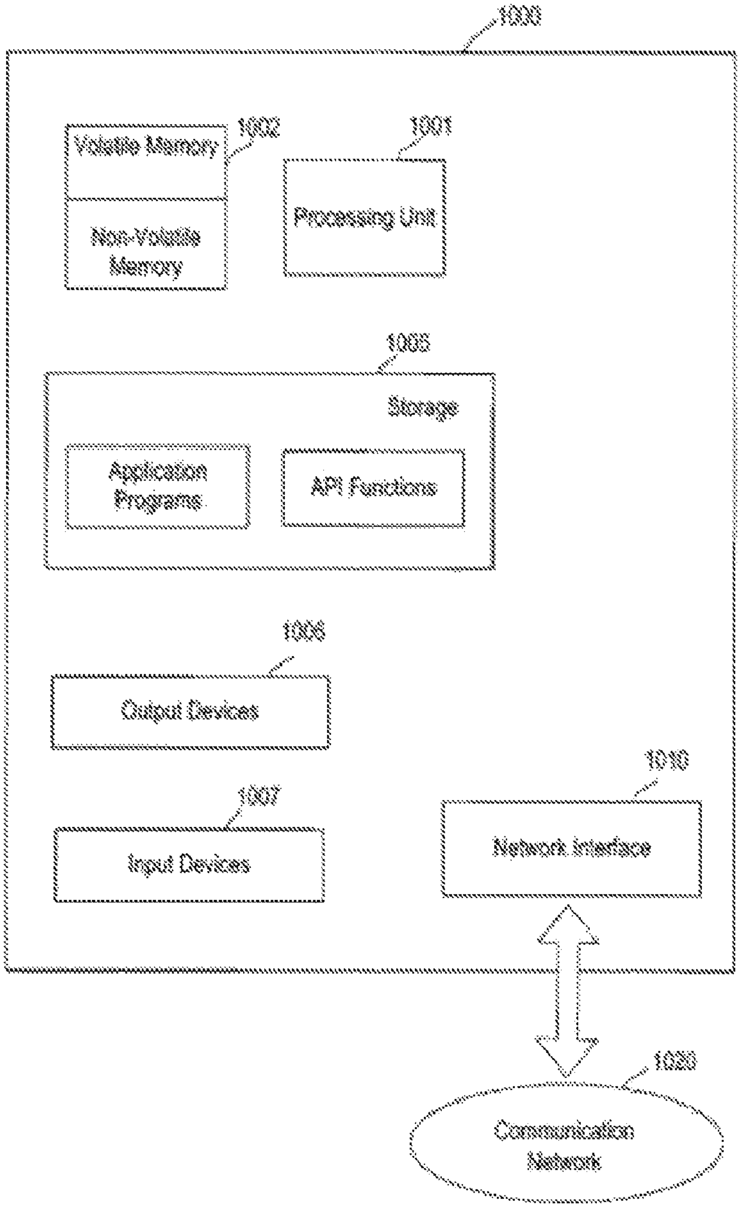
FIG. 7 is shows, schematically, an illustrative computer 1000 on which any aspect of the present disclosure may be implemented.

FIG. 7 shows, schematically, an illustrative computer 1000 on which any aspect of the present disclosure may be implemented.

In the example shown in FIG. 7, the computer 1000 includes a processing unit 1001 having one or more processors and a non-transitory computer-readable storage medium 1002 that may include, for example, volatile and/or non-volatile memory. The memory 1002 may store one or more instructions to program the processing unit 1101 to perform any of the functions described herein. The computer 1000 may also include other types of non-transitory computer-readable medium, such as storage 1005 (e.g., one or more disk drives) in addition to the system memory 1002. The storage 1005 may also store one or more application programs and/or resources used by application programs (e.g., software libraries), which may be loaded into the memory 1002.

The computer 1000 may have one or more input devices and/or output devices, such as devices 1006 and 1007 illustrated in FIG. 7. These devices may be used, for instance, to present a user interface. Examples of output devices that may be used to provide a user interface include printers, display screens, and other devices for visual output, speakers and other devices for audible output, braille displays and other devices for haptic output, etc. Examples of input devices that may be used for a user interface include keyboards, pointing devices (e.g., mice, touch pads, and digitizing tablets), microphones, etc. For instance, the input devices 1007 may include a microphone for capturing audio signals, and the output devices 1006 may include a display screen for visually rendering, and/or a speaker for audibly rendering, recognized text.

In the example shown in FIG. 7, the computer 1000 also includes one or more network interfaces (e.g., the network interface 1010) to enable communication via various networks (e.g., the network 1020). Examples of networks include local area networks (e.g., an enterprise network), wide area networks (e.g., the Internet), etc. Such networks may be based on any suitable technology and operate according to any suitable protocol, and may include wireless networks and/or wired networks (e.g., fiber optic networks).

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing descriptions and drawings are by way of example only.

The above-described embodiments of the present disclosure can be implemented in any of numerous ways. For example, the embodiments may be implemented using hardware, software, or a combination thereof. When implemented in software, the software code may be executed on any suitable processor or collection of processors, whether provided in a single computer, or distributed among multiple computers.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure discussed above. The computer-readable medium or media may be transportable, such that the program or programs stored thereon may be loaded onto one or more different computers or other processors to implement various aspects of the present disclosure as discussed above.

The terms "program" or "software" are used herein to refer to any type of computer code or set of computer-executable instructions that may be employed to program one or more processors to implement various aspects of the present disclosure as discussed above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey how the fields are related. However, any suitable mechanism may be used to relate information in fields of a data structure, including through the use of pointers, tags, or other mechanisms that establish how the data elements are related.

Various features and aspects of the present disclosure may be used alone, in any combination of two or more, or in a variety of arrangements not specifically discussed in the embodiments described in the foregoing, and are therefore not limited to the details and arrangement of components set forth in the foregoing description or illustrated in the drawings. For example, aspects described in one embodiment may be combined in any manner with aspects described in other embodiments.

Also, the techniques disclosed herein may be embodied as methods, of which examples have been provided. The acts performed as part of a method may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," "based on," "according to," and variations thereof herein, is meant to encompass the items listed thereafter and equivalents thereof as well as additional items.

What is claimed is:

1. A computer-implemented method for analyzing a random behavior of a computational architecture, the method comprising acts of:

analyzing source code of the computational architecture to identify at least one callable object that is likely to impact a selected metric of the computational architecture;

analyzing binary code of the computational architecture to determine whether the at least one callable object is reachable during execution of the binary code; and generating a tracepoint to be inserted into the binary code, wherein the tracepoint, when executed by a processor, causes the processor to collect a selected type of information during execution of the binary code, wherein generating the tracepoint comprises selecting at least one argument from one or more arguments accepted by the at least one callable object, and generating the tracepoint to collect information on the at least one argument, wherein the tracepoint is generated to collect at least one selected characteristic of the at least one argument, and wherein the at least one selected characteristic comprises a characteristic that is likely to impact the selected metric of the computational architecture.

2. The method of claim 1, further comprising inserting the tracepoint into the binary code.

3. The method of claim 2, wherein the tracepoint is inserted into the binary code by a system loader.

4. The method of claim 1, wherein the at least one argument is selected based on a type of the at least one argument.

5. The method of claim 1, wherein the at least one argument is selected based on information obtained from an abstract syntax tree produced by a compiler.

6. A system comprising:

at least one computer processor; and at least one computer-readable storage medium having stored thereon instructions which, when executed, program the at least one computer processor to perform a method comprising acts of:

analyzing source code of a computational architecture to identify at least one callable object that is likely to impact a selected metric of the computational architecture;

analyzing binary code of the computational architecture to determine whether the at least one callable object is reachable during execution of the binary code; and generating a tracepoint to be inserted into the binary code, wherein the tracepoint, when executed by a processor, causes the processor to collect a selected type of information during execution of the binary code, wherein generating the tracepoint comprises selecting at least one argument from one or more arguments accepted by the at least one callable object, and generating the tracepoint to collect information on the at least one argument, wherein the tracepoint is generated to collect at least one selected characteristic of the at least one argument, and wherein the at least one selected characteristic comprises a characteristic that is likely to impact the selected metric of the computational architecture.

7. The system of claim 6, wherein the at least one computer processor is further programmed to insert the tracepoint into the binary code.

8. The system of claim 7, wherein the tracepoint is inserted into the binary code by a system loader.

9. The system of claim 6, wherein the at least one argument is selected based upon a type of the at least one argument.

10. The system of claim 6, wherein the at least one argument is selected based upon information obtained from an abstract syntax tree produced by a compiler.

11. At least one non-transitory computer-readable storage medium having stored thereon instructions which, when executed, program at least one processor to perform a method comprising acts of:

analyzing source code of a computational architecture to identify at least one callable object that is likely to impact a selected metric of the computational architecture;

analyzing binary code of the computational architecture to determine whether the at least one callable object is reachable during execution of the binary code; and generating a tracepoint to be inserted into the binary code, wherein the tracepoint, when executed by a processor, causes the processor to collect a selected type of information during execution of the binary code, wherein generating the tracepoint comprises selecting at least one argument from one or more arguments accepted by the at least one callable object, and generating the tracepoint to collect information on the at least one argument, wherein the tracepoint is generated to collect at least one selected characteristic of the at least one argument, and wherein the at least one selected characteristic comprises a characteristic that is likely to impact the selected metric of the computational architecture.

12. The at least one non-transitory computer-readable storage medium of claim 11, further comprising instructions stored thereon which, when executed, program at least one processor to perform an act of inserting the tracepoint into the binary code.

13. The at least one non-transitory computer-readable storage medium of claim 11, wherein the at least one argument is selected based on at least one of:

a type of the at least one argument; and information obtained from an abstract syntax tree produced by a compiler.

14. The at least one non-transitory computer-readable storage medium of claim 12, wherein the tracepoint is inserted into the binary code by a system loader.

15. The at least one non-transitory computer-readable storage medium of claim 11, wherein the at least one argument is selected based on a type of the at least one argument.

16. The at least one non-transitory computer-readable storage medium of claim 11, wherein the at least one argument is selected based on information obtained from an abstract syntax tree produced by a compiler.

* * * * *